(12) United States Patent
Kovel

(10) Patent No.: US 11,129,444 B1
(45) Date of Patent: Sep. 28, 2021

(54) FOOTWEAR ARTICLE HAVING REPURPOSED MATERIAL WITH CONCEALING LAYER

(71) Applicant: NIKE, Inc., Beaverton, OR (US)

(72) Inventor: Kim Kovel, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/988,140

(22) Filed: Aug. 7, 2020

(51) Int. Cl.
| | |
|---|---|
| A43B 23/00 | (2006.01) |
| A43B 1/12 | (2006.01) |
| A43B 23/02 | (2006.01) |
| A43B 13/04 | (2006.01) |
| A43B 23/07 | (2006.01) |
| A43B 1/00 | (2006.01) |

(52) U.S. Cl.
CPC ............ *A43B 23/07* (2013.01); *A43B 1/0027* (2013.01)

(58) Field of Classification Search
None
See application file for complete search history.

(56) References Cited

U.S. PATENT DOCUMENTS

| | | | |
|---|---|---|---|
| 2,345,533 A | 3/1944 | Witt | |
| 2,607,130 A | 8/1952 | Pearson | |
| 2,929,803 A | 3/1960 | Henry et al. | |
| 3,011,383 A | 12/1961 | Sylvester et al. | |
| 3,060,513 A | 10/1962 | Klink et al. | |
| 3,376,403 A | 4/1968 | Driga | |
| 4,231,369 A | 11/1980 | Sorensen et al. | |
| 4,300,294 A * | 11/1981 | Riecken | A43B 7/26 36/101 |
| 4,523,005 A | 6/1985 | Szycher | |
| 4,705,356 A | 11/1987 | Berning et al. | |
| 5,269,995 A | 12/1993 | Ramanathan et al. | |
| 5,334,690 A | 8/1994 | Schafheutle et al. | |
| 5,346,934 A * | 9/1994 | Chriss | C08L 21/00 428/318.8 |
| 5,500,067 A * | 3/1996 | Jenkner | A43B 13/187 156/145 |
| 5,572,817 A | 11/1996 | Chien | |

(Continued)

FOREIGN PATENT DOCUMENTS

| | | |
|---|---|---|
| AU | 2007200128 A1 | 8/2007 |
| CH | 702116 B1 | 5/2011 |

(Continued)

OTHER PUBLICATIONS

"Cycloolefin Copolymer (COC) Brochure", TOPAS Advanced Polymers, Available online at: <https://topas.com/tech-center/brochures>, Retrieved online Jan. 11, 2021, pp. 1-20.

(Continued)

*Primary Examiner* — Jila M Mohandesi
(74) *Attorney, Agent, or Firm* — Shook, Hardy & Bacon, L.L.P.

(57) ABSTRACT

In example aspects, materials are repurposed for footwear manufacturing. That is, in some instances, materials in the footwear manufacturing supply chain are potentially subject to disposal. However, aspects of this disclosure sustainably repurpose those materials (that might otherwise be disposed of) to be used in footwear articles. In some aspects, the repurposed materials may be obscured with a concealing layer.

10 Claims, 10 Drawing Sheets

(56) References Cited

U.S. PATENT DOCUMENTS

| | | | |
|---|---|---|---|
| 5,628,128 A * | 5/1997 | Miller | A43B 7/1495 36/114 |
| 5,671,495 A * | 9/1997 | Chen | A43B 13/02 12/142 G |
| 5,713,141 A | 2/1998 | Mitchell et al. | |
| 5,722,322 A | 3/1998 | Watanabe | |
| 5,813,148 A | 9/1998 | Guerra | |
| 5,815,950 A | 10/1998 | Wang | |
| 5,928,456 A | 7/1999 | Souparis | |
| 5,930,921 A | 8/1999 | Sorofman et al. | |
| 5,952,065 A | 9/1999 | Mitchell et al. | |
| 5,969,076 A | 10/1999 | Lai et al. | |
| 5,979,078 A | 11/1999 | McLaughlin | |
| 6,013,340 A | 1/2000 | Bonk et al. | |
| 6,082,025 A | 7/2000 | Bonk et al. | |
| 6,127,026 A | 10/2000 | Bonk et al. | |
| 6,147,726 A | 11/2000 | Kubota et al. | |
| 6,157,489 A | 12/2000 | Bradley et al. | |
| 6,164,777 A | 12/2000 | Li et al. | |
| 6,203,868 B1 | 3/2001 | Bonk et al. | |
| 6,321,465 B1 | 11/2001 | Bonk et al. | |
| 6,402,879 B1 | 6/2002 | Tawney et al. | |
| 6,551,531 B1 | 4/2003 | Ford et al. | |
| 6,761,959 B1 | 7/2004 | Bonkowski et al. | |
| 6,897,281 B2 | 5/2005 | Lubnin et al. | |
| 7,006,294 B2 | 2/2006 | Steenblik et al. | |
| 7,476,705 B2 | 1/2009 | Pajerski | |
| 7,800,814 B2 | 9/2010 | Nishimura et al. | |
| 7,848,008 B2 | 12/2010 | Nishimura et al. | |
| 7,903,339 B2 | 3/2011 | Banerjee et al. | |
| 7,955,695 B2 | 6/2011 | Argoitia | |
| 8,264,637 B2 | 9/2012 | Cho et al. | |
| 8,322,636 B2 | 12/2012 | Wu et al. | |
| 8,339,597 B2 | 12/2012 | Dal Negro et al. | |
| 8,408,470 B2 | 4/2013 | Komatsu et al. | |
| 8,486,494 B2 | 7/2013 | Fukazawa et al. | |
| 8,558,137 B2 | 10/2013 | Hosono et al. | |
| 8,685,185 B2 | 4/2014 | Guo et al. | |
| 8,889,234 B2 | 11/2014 | Kwon et al. | |
| 9,102,195 B2 | 8/2015 | Raksha et al. | |
| 9,134,468 B2 | 9/2015 | Noizet et al. | |
| 9,185,947 B2 * | 11/2015 | Spencer | B29B 17/04 |
| 9,220,951 B1 | 12/2015 | Comeau | |
| 9,279,771 B2 | 3/2016 | Aizenberg et al. | |
| 9,527,340 B2 | 12/2016 | Szumski et al. | |
| 9,557,457 B2 | 1/2017 | Gocho et al. | |
| 9,931,804 B2 | 4/2018 | Le et al. | |
| 10,048,411 B2 | 8/2018 | Parker | |
| 10,649,113 B2 | 5/2020 | Bee et al. | |
| 10,779,617 B2 | 9/2020 | Iovu | |
| 10,928,553 B2 | 2/2021 | Bee et al. | |
| 2001/0028921 A1 | 10/2001 | Shaw et al. | |
| 2001/0042321 A1 | 11/2001 | Tawney et al. | |
| 2001/0053454 A1 | 12/2001 | Higashi et al. | |
| 2002/0150629 A1 | 10/2002 | Nishimura et al. | |
| 2002/0183133 A1 | 12/2002 | Sano | |
| 2002/0191234 A1 | 12/2002 | Ishimoto et al. | |
| 2003/0074808 A1 | 4/2003 | Weaver et al. | |
| 2003/0086030 A1 | 5/2003 | Taniguchi et al. | |
| 2004/0006889 A1 * | 1/2004 | Chen | A43B 1/0072 36/3 R |
| 2004/0112252 A1 | 6/2004 | Zimmermann et al. | |
| 2004/0142185 A1 | 7/2004 | Takushima | |
| 2004/0169928 A1 | 9/2004 | Nilsen et al. | |
| 2004/0172855 A1 | 9/2004 | Aslanides | |
| 2004/0173855 A1 | 9/2004 | Masuoka et al. | |
| 2005/0031816 A1 | 2/2005 | Chang et al. | |
| 2005/0056954 A1 | 3/2005 | Devlin et al. | |
| 2005/0063067 A1 | 3/2005 | Phillips et al. | |
| 2005/0211114 A1 | 9/2005 | Fahrenbach et al. | |
| 2005/0260369 A1 | 11/2005 | Graf et al. | |
| 2005/0274041 A1 * | 12/2005 | Collett | A43B 1/0027 36/11.5 |
| 2006/0023327 A1 | 2/2006 | Coombs et al. | |
| 2006/0112599 A1 | 6/2006 | Braynock et al. | |
| 2006/0128823 A1 | 6/2006 | Tsuchimura et al. | |
| 2006/0198121 A1 | 9/2006 | Thorpe et al. | |
| 2006/0270553 A1 | 11/2006 | Mori | |
| 2007/0008439 A1 | 1/2007 | Nakayama et al. | |
| 2007/0058260 A1 | 3/2007 | Steenblik et al. | |
| 2007/0076069 A1 | 4/2007 | Edwards et al. | |
| 2008/0040951 A1 | 2/2008 | Kates | |
| 2008/0066347 A1 | 3/2008 | Suzuki | |
| 2008/0248281 A1 | 10/2008 | Nakaguma et al. | |
| 2008/0274359 A1 | 11/2008 | Lawrence et al. | |
| 2009/0174944 A1 | 7/2009 | Yuasa et al. | |
| 2009/0301649 A1 | 12/2009 | Augsberg et al. | |
| 2010/0024597 A1 | 2/2010 | Dover et al. | |
| 2010/0104810 A1 | 4/2010 | Fukazawa et al. | |
| 2010/0152065 A1 | 6/2010 | Nishimura et al. | |
| 2010/0199406 A1 * | 8/2010 | Dua | B32B 5/26 2/115 |
| 2010/0199520 A1 | 8/2010 | Dua et al. | |
| 2010/0222442 A1 | 9/2010 | Prissok et al. | |
| 2010/0245978 A1 | 9/2010 | Baumberg et al. | |
| 2010/0254007 A1 | 10/2010 | Toda | |
| 2010/0266946 A1 | 10/2010 | Shirai et al. | |
| 2010/0290109 A1 | 11/2010 | Kurt et al. | |
| 2010/0291358 A1 | 11/2010 | Takahashi et al. | |
| 2011/0026208 A1 | 2/2011 | Utsuro et al. | |
| 2011/0033670 A1 | 2/2011 | Nishikawa et al. | |
| 2011/0043911 A1 | 2/2011 | Kaneiwa et al. | |
| 2011/0090564 A1 | 4/2011 | Utsuro et al. | |
| 2011/0123754 A1 | 5/2011 | Shirai et al. | |
| 2011/0171440 A1 | 7/2011 | Cheng et al. | |
| 2011/0183111 A1 | 7/2011 | Yuasa et al. | |
| 2011/0234953 A1 | 9/2011 | Amimori et al. | |
| 2011/0234969 A1 | 9/2011 | Amimori et al. | |
| 2011/0253288 A1 | 10/2011 | Xie et al. | |
| 2011/0262675 A1 | 10/2011 | Inamiya et al. | |
| 2011/0298207 A1 | 12/2011 | Despland et al. | |
| 2012/0015118 A1 | 1/2012 | Zheludev et al. | |
| 2012/0015145 A1 | 1/2012 | Depres | |
| 2012/0034291 A1 | 2/2012 | Amsden et al. | |
| 2012/0121820 A1 | 5/2012 | Kaplan et al. | |
| 2012/0133672 A1 | 5/2012 | Joo | |
| 2012/0139230 A1 | 6/2012 | Whiteman et al. | |
| 2012/0204443 A1 | 8/2012 | Vertuccio | |
| 2012/0231489 A1 | 9/2012 | Lenhert | |
| 2012/0236415 A1 | 9/2012 | Nagano et al. | |
| 2012/0249718 A1 | 10/2012 | Sohn et al. | |
| 2012/0255201 A1 | 10/2012 | Little | |
| 2012/0255452 A1 | 10/2012 | Bower et al. | |
| 2012/0276332 A1 | 11/2012 | Conolly et al. | |
| 2012/0297642 A1 * | 11/2012 | Schaefer | A43B 1/0027 36/45 |
| 2013/0004721 A1 | 1/2013 | Hara et al. | |
| 2013/0004722 A1 | 1/2013 | Hara et al. | |
| 2013/0004731 A1 | 1/2013 | Hara et al. | |
| 2013/0004754 A1 | 1/2013 | Hara et al. | |
| 2013/0148221 A1 | 6/2013 | Banerjee et al. | |
| 2013/0183487 A1 | 7/2013 | Henze et al. | |
| 2013/0243693 A1 | 9/2013 | Kaplan et al. | |
| 2013/0330710 A1 | 12/2013 | Omenetto et al. | |
| 2014/0016177 A1 | 1/2014 | Aizenberg et al. | |
| 2014/0050899 A1 | 2/2014 | Kukoff | |
| 2014/0104686 A1 | 4/2014 | Yuasa et al. | |
| 2014/0106139 A1 | 4/2014 | Abrams | |
| 2014/0161974 A1 | 6/2014 | Erho et al. | |
| 2014/0182169 A1 | 7/2014 | Mack | |
| 2014/0250734 A1 | 9/2014 | Zheng | |
| 2014/0254017 A1 | 9/2014 | Manoharan et al. | |
| 2015/0001840 A1 | 1/2015 | Parker | |
| 2015/0035269 A1 | 2/2015 | Hooper et al. | |
| 2015/0076808 A1 | 3/2015 | Kim et al. | |
| 2015/0109657 A1 | 4/2015 | Baumberg et al. | |
| 2015/0118124 A1 | 4/2015 | Khorasaninejad et al. | |
| 2015/0146280 A1 | 5/2015 | Degott et al. | |
| 2015/0192897 A1 | 7/2015 | Schilling et al. | |
| 2015/0202834 A1 | 7/2015 | Free et al. | |
| 2015/0250263 A1 | 9/2015 | Robinson, Jr. | |
| 2015/0283743 A1 | 10/2015 | Park et al. | |
| 2015/0309232 A1 | 10/2015 | Banerjee | |
| 2015/0352883 A1 | 12/2015 | Schmid et al. | |

(56) References Cited

U.S. PATENT DOCUMENTS

| | | | |
|---|---|---|---|
| 2015/0352888 A1 | 12/2015 | Schmid et al. |
| 2016/0064696 A1 | 3/2016 | Collier et al. |
| 2016/0101601 A1 | 4/2016 | Abrams |
| 2016/0116645 A1 | 4/2016 | Parker |
| 2016/0128433 A1 | 5/2016 | Downing et al. |
| 2016/0131808 A1 | 5/2016 | Kristensen et al. |
| 2016/0146984 A1 | 5/2016 | Jiang et al. |
| 2016/0168386 A1 | 6/2016 | Aizenberg et al. |
| 2016/0176223 A1 | 6/2016 | Degott et al. |
| 2016/0178493 A1 | 6/2016 | Kawanaka et al. |
| 2016/0202394 A1 | 7/2016 | Clausen et al. |
| 2016/0202401 A1 | 7/2016 | Christiansen et al. |
| 2016/0209642 A1 | 7/2016 | Aizenberg et al. |
| 2016/0282527 A1 | 9/2016 | Saito et al. |
| 2016/0325310 A1 | 11/2016 | Schmid et al. |
| 2017/0023711 A1 | 1/2017 | Jiang et al. |
| 2017/0081535 A1 | 3/2017 | Kohri et al. |
| 2017/0087691 A1 | 3/2017 | Yokoyama et al. |
| 2017/0090084 A1 | 3/2017 | Wilson et al. |
| 2017/0129200 A1 | 5/2017 | Adami et al. |
| 2017/0157653 A1 | 6/2017 | Parker |
| 2017/0248746 A1 | 8/2017 | Banerjee et al. |
| 2017/0347745 A1* | 12/2017 | Figur | A43B 1/0027 |
| 2018/0252158 A1 | 9/2018 | Malkamaki et al. |
| 2018/0257360 A1 | 9/2018 | Liponkoski |
| 2018/0284330 A1 | 10/2018 | Parker |
| 2018/0357316 A1 | 12/2018 | Neuvonen et al. |
| 2019/0098946 A1 | 4/2019 | Bee et al. |
| 2019/0098958 A1 | 4/2019 | Bee et al. |
| 2019/0099967 A1 | 4/2019 | Bee et al. |
| 2019/0099968 A1 | 4/2019 | Bee et al. |
| 2019/0099978 A1 | 4/2019 | Bee et al. |
| 2019/0099979 A1 | 4/2019 | Bee et al. |
| 2019/0113655 A1 | 4/2019 | Bee et al. |
| 2019/0113656 A1 | 4/2019 | Bee et al. |
| 2020/0040882 A1 | 2/2020 | Kalmari et al. |
| 2020/0088908 A1 | 3/2020 | Bee et al. |
| 2020/0181550 A1 | 6/2020 | Kalmari et al. |
| 2020/0217986 A1 | 7/2020 | Bee et al. |
| 2020/0217987 A1 | 7/2020 | Bee et al. |
| 2020/0240667 A1 | 7/2020 | Lind |
| 2020/0269561 A1 | 8/2020 | Bee et al. |
| 2020/0275728 A1 | 9/2020 | Bee et al. |
| 2020/0305526 A1 | 10/2020 | Gantz et al. |
| 2020/0305527 A1 | 10/2020 | Gantz et al. |
| 2020/0308734 A1 | 10/2020 | Gantz et al. |
| 2020/0314185 A1 | 10/2020 | Makynen et al. |
| 2020/0371272 A1 | 11/2020 | Bee et al. |
| 2020/0407838 A1 | 12/2020 | Gantz et al. |

FOREIGN PATENT DOCUMENTS

| | | | | |
|---|---|---|---|---|
| CN | 1324222 A | 11/2001 |
| CN | 1799857 A | 7/2006 |
| CN | 101381903 A | 3/2009 |
| CN | 101396884 A | 4/2009 |
| CN | 101633786 A | 1/2010 |
| CN | 101666886 A | 3/2010 |
| CN | 101781860 A | 7/2010 |
| CN | 102548752 A | 7/2012 |
| CN | 102691202 A | 9/2012 |
| CN | 103173039 A | 6/2013 |
| CN | 103965699 A | 8/2014 |
| CN | 104334042 A | 2/2015 |
| CN | 104592971 A | 5/2015 |
| CN | 105050442 A | 11/2015 |
| CN | 105271796 A | 1/2016 |
| CN | 105862000 A | 8/2016 |
| CN | 106080001 A | 11/2016 |
| CN | 107111002 A | 8/2017 |
| DE | 20200346 U1 | 4/2002 |
| DE | 102010025159 A1 | 12/2011 |
| EP | 0335309 A1 | 10/1989 |
| EP | 0905530 A2 | 3/1999 |
| EP | 1624026 A1 | 2/2006 |
| EP | 1653256 A1 | 5/2006 |
| EP | 2012148 A1 | 1/2009 |
| EP | 2077459 A1 | 7/2009 |
| EP | 2462908 A1 | 6/2012 |
| EP | 3151042 A1 | 4/2017 |
| EP | 3244240 A1 | 11/2017 |
| EP | 3278150 A2 | 2/2018 |
| GB | 2374818 A | 10/2002 |
| GB | 2481697 A | 1/2012 |
| GB | 2524840 A | 10/2015 |
| GB | 2525020 A | 10/2015 |
| JP | 60-1180 U | 1/1985 |
| JP | 2002-524317 A | 8/2002 |
| JP | 2005-226196 A | 8/2005 |
| JP | 2006-288907 A | 10/2006 |
| JP | 2009-211077 A | 9/2009 |
| JP | 2010-111974 A | 5/2010 |
| JP | 2011-85779 A | 4/2011 |
| JP | 2011-104931 A | 6/2011 |
| JP | 2012-159589 A | 8/2012 |
| JP | 2013-29805 A | 2/2013 |
| JP | 2013-80049 A | 5/2013 |
| JP | 2014-189719 A | 10/2014 |
| JP | 2015-69076 A | 4/2015 |
| JP | 2016-502470 A | 1/2016 |
| JP | 2017-32409 A | 2/2017 |
| KR | 10-1472929 B1 | 12/2014 |
| TW | 200628089 A | 8/2006 |
| WO | 97/01972 A1 | 1/1997 |
| WO | 03/046039 A1 | 6/2003 |
| WO | 03/068525 A1 | 8/2003 |
| WO | 03/095657 A2 | 11/2003 |
| WO | 2007/037393 A1 | 4/2007 |
| WO | 2007/038097 A1 | 4/2007 |
| WO | WO-2007096914 A1 * | 8/2007 | | A43B 1/0072 |
| WO | 2008/076339 A2 | 6/2008 |
| WO | 2009/062341 A1 | 5/2009 |
| WO | 2010/047322 A1 | 4/2010 |
| WO | 2010/119248 A2 | 10/2010 |
| WO | 2011/161482 A1 | 12/2011 |
| WO | 2012/055105 A1 | 5/2012 |
| WO | 2013/151547 A1 | 10/2013 |
| WO | 2014/022049 A1 | 2/2014 |
| WO | 2014/059424 A2 | 4/2014 |
| WO | 2014/117673 A1 | 8/2014 |
| WO | 2014/133514 A1 | 9/2014 |
| WO | 2015/051367 A1 | 4/2015 |
| WO | 2015/151479 A1 | 10/2015 |
| WO | 2015/170120 A1 | 11/2015 |
| WO | 2016/015973 A1 | 2/2016 |
| WO | 2016/092014 A1 | 6/2016 |
| WO | 2016/103980 A1 | 6/2016 |
| WO | 2016/140779 A1 | 9/2016 |
| WO | 2016/156863 A2 | 10/2016 |
| WO | 2016/164551 A1 | 10/2016 |
| WO | 2016/193252 A1 | 12/2016 |
| WO | 2017/006314 A1 | 1/2017 |
| WO | 2017/032928 A1 | 3/2017 |
| WO | 2017/041085 A1 | 3/2017 |
| WO | 2017/115806 A1 | 7/2017 |
| WO | 2017/151496 A1 | 9/2017 |
| WO | 2018/130856 A1 | 7/2018 |
| WO | 2018/160866 A1 | 9/2018 |
| WO | 2019/038560 A1 | 2/2019 |
| WO | 2019/067969 A1 | 4/2019 |
| WO | 2019/086770 A1 | 5/2019 |
| WO | 2019/224426 A1 | 11/2019 |
| WO | 2020/030844 A1 | 2/2020 |

OTHER PUBLICATIONS

Final Office Action received for U.S. Appl. No. 16/648,726, dated Mar. 17, 2021, 12 pages.

International Preliminary Report on Patentability received for PCT Patent Application No. PCT/US2014/015275, dated Mar. 23, 2015, 7 pages.

(56) References Cited

OTHER PUBLICATIONS

International Search Report and Written Opinion received for PCT Patent Application No. PCT/US2014/015275, dated Jun. 25, 2014, 11 pages.
International Search Report and Written Opinion received for PCT Patent Application No. PCT/US2020/055543, dated Feb. 5, 2021, 12 pages.
International Search Report and Written Opinion received for PCT Patent Application No. PCT/US2020/056300, dated Feb. 16, 2021, 12 pages.
Notice of Allowance received for U.S. Appl. No. 16/146,552, dated Apr. 16, 2021, 5 pages.
Written Opinion of the International Preliminary Examining Authority received for PCT Patent Application No. PCT/US2018/053529, dated Aug. 6, 2019, 4 pages.
Written Opinion of the International Preliminary Examining Authority received for PCT Patent Application No. PCT/US2020/022099, dated Dec. 1, 2020, 4 pages.
Written Opinion of the International Preliminary Examining Authority received for PCT Patent Application No. PCT/US2020/022109, dated Dec. 16, 2020, 10 pages.
Written Opinion of the International Preliminary Examining Authority received for PCT Patent Application No. PCT/US2020/022129, dated Nov. 13, 2020, 6 pages.
Written Opinion of the International Preliminary Examining Authority received for PCT Patent Application No. PCT/US2020/022148, dated Oct. 13, 2020, 6 pages.
Written Opinion of the International Preliminary Examining Authority received for PCT Patent Application No. PCT/US2020/043271, dated Feb. 11, 2021, 7 pages.
"Color", Available online at: <www.dictionary.com>, Accessed on Jun. 2, 2020.
Ex Parte Quayle Action received for U.S. Appl. No. 16/648,887, mailed on Aug. 18, 2020, 9 pages.
Final Office Action received for U.S. Appl. No. 16/146,572, dated Oct. 6, 2020, 9 pages.
Final Office Action received for U.S. Appl. No. 16/146,636, dated Oct. 2, 2020, 21 pages.
Final Office Action received for U.S. Appl. No. 16/987,059, dated Jan. 1, 2021, 13 pages.
International Search Report and Written Opinion received for PCT Patent Application No. PCT/US2020/044626 dated Oct. 30, 2020, 16 pages.
International Search Report and Written Opinion received for PCT Patent Application No. PCT/US2020/043271 dated Oct. 30, 2020, 11 pages.
International Search Report and Written Opinion received for PCT Patent Application No. PCT/US2020/043273 dated Oct. 8, 2020, 11 pages.
International Search Report and Written Opinion received for PCT Patent Application No. PCT/US2020/044628, dated Oct. 30, 2020, 16 pages.
International Search Report and Written Opinion received for PCT Patent Application No. PCT/US2020/044624, dated Oct. 30, 2020, 16 pages.
Iohara et al., "Structurally Colored Fibers", Chemical fibers International, vol. 50, No. 1, XP000908694, ISSN: 0340-3343, Feb. 1, 2000, pp. 38-39.
Iwata et al., "Bio-Inspired Bright Structurally Colored Colloidal Amorphous Array Enhanced by Controlling Thickness and Black Background", Advanced Materials, vol. 29, Issue 26, Article No. 1605050, Feb. 21, 2017, pp. 1-8.
Non-Final Office Action received for U.S. Appl. No. 16/146,532, dated Sep. 15, 2020, 19 pages.
Non-Final Office Action received for U.S. Appl. No. 16/146,552, dated Sep. 25, 2020, 10 pages.
Non-Final Office Action received for U.S. Appl. No. 16/146,572, dated Jan. 13, 2021, 7 pages.
Non-Final Office Action received for U.S. Appl. No. 16/648,726, dated Nov. 12, 2020, 13 pages.
Non-Final Office Action received for U.S. Appl. No. 16/987,059, dated Nov. 16, 2020, 13 pages.
Non-Final Office Action received for U.S. Appl. No. 16/988,252, dated Feb. 1, 2021, 14 pages.
Notice of Allowance received for U.S. Appl. No. 16/146,515, dated Oct. 19, 2020, 12 pages.
Notice of Allowance received for U.S. Appl. No. 16/146,552, dated Jan. 22, 2021, 8 pages.
Notice of Allowance received for U.S. Appl. 16/146,560, dated Oct. 23, 2020, 9 pages.
Notice of Allowance received for U.S. Appl. No. 16/648,887, dated Nov. 16, 2020, 10 pages.
Notice of Allowance received for U.S. Appl. No. 16/825,642, dated Nov. 4, 2020, 5 pages.
Prosecution of U.S. Appl. No. 16/146,515, filed Sep. 28, 2018, titled "Structurally-Colored Articles and Methods for Making and Using Structurally-Colored Articles".
Prosecution of U.S. Appl. No. 16/146,532, filed Sep. 28, 2018, titled "Structurally-Colored Articles and Methods for Making and Using Structurally-Colored Articles".
Prosecution of U.S. Appl. No. 16/146,552, filed Sep. 28, 2018, titled "Structurally-Colored Articles and Methods for Making and Using Structurally-Colored Articles".
Prosecution of U.S. Appl. No. 16/146,560, filed Sep. 28, 2018, titled "Structurally-Colored Articles and Methods for Making and Using Structurally-Colored Articles".
Prosecution of U.S. Appl. No. 16/146,572, filed Sep. 28, 2018, titled "Structurally-Colored Articles and Methods for Making and Using Structurally-Colored Articles".
Prosecution of U.S. Appl. No. 16/146,614, filed Sep. 28, 2018, titled "Structurally-Colored Articles and Methods for Making and Using Structurally-Colored Articles".
Prosecution of U.S. Appl. No. 16/146,636, filed Sep. 28, 2018, titled "Structurally-Colored Articles and Methods for Making and Using Structurally-Colored Articles".
Prosecution of U.S. Appl. No. 16/146,721, filed Sep. 28, 2018, titled "Structurally-Colored Articles and Methods for Making and Using Structurally-Colored Articles".
Prosecution of U.S. Appl. No. 16/648,726, filed Mar. 19, 2020, titled "Structurally-Colored Articles and Methods for Making and Using Structurally-Colored Articles".
Prosecution of U.S. Appl. No. 16/648,887, filed Mar. 19, 2020, titled "Structurally-Colored Articles and Methods of Making and Using Structurally-Colored Articles".
Prosecution of U.S. Appl. No. 16/692,866, filed Nov. 22, 2019, titled "Structurally-Colored Articles and Methods for Making and Using Structurally-Colored Articles".
Prosecution of U.S. Appl. No. 16/815,859, filed Mar. 11, 2020, titled "Recyclable Structurally-Colored Structures and Articles, and Methods of Recycling Structures and Articles".
Prosecution of U.S. Appl. No. 16/815,879, filed Mar. 11, 2020, titled "Structurally-Colored Filaments and Methods for Making and Using Structurally-Colored Filaments".
Prosecution of U.S. Appl. No. 16/815,886, filed Mar. 11, 2020, titled "Structurally-Colored Articles and Methods for Making and Using Structurally-Colored Articles".
Prosecution of U.S. Appl. No. 16/815,890, filed Mar. 11, 2020, titled "Structurally-Colored Articles and Methods for Making and Using Structurally-Colored Articles".
Prosecution of U.S. Appl. No. 16/825,629, filed Mar. 20, 2020, titled "Structurally-Colored Articles and Methods for Making and Using Structurally-Colored Articles".
Prosecution of U.S. Appl. No. 16/825,642, filed Mar. 20, 2020, titled "Structurally-Colored Articles and Methods for Making and Using Structurally-Colored Articles".
Prosecution of U.S. Appl. No. 16/987,059, filed Aug. 6, 2020, titled "Structurally-Colored Articles and Methods for Making and Using Structurally-Colored Articles".
"Texture", Available online at: <www.vocabulary.com>, Accessed on Jun. 2, 2020.
Non-Final Office Action received for U.S. Appl. No. 16/146,532, dated Feb. 23, 2021, 17 pages.

(56) References Cited

OTHER PUBLICATIONS

Final Office Action received for U.S. Appl. No. 16/146,532, dated Apr. 23, 2021, 13 pages.
Nike's New Air Force 1 "Reveal" Comes With DIY Tear-Away Uppers, hypebeast.com, Available online at: <https://hypebeast.com/2021/2/nike-air-force-1-low-reveal-fauna-brown-arctic-punch-pale-vanilla-dj9941-244-info>, Feb. 8, 2021, 9 pages.
Non-Final Office Action received for U.S. Appl. No. 16/648,726, dated May 27, 2021, 10 pages.
Non-Final Office Action received for U.S. Appl. No. 16/987,059, dated Jun. 23, 2021, 13 pages.
Notice of Allowance received for U.S. Appl. No. 16/988,252, dated May 21, 2021, 11 pages.
The 'Stranger Things' x Nike "Upside Down" Pack, hypebeast.com, Available online at: <https://hypebeast.com/2019/8/stranger-things-nike-upside-down-pack-tailwind-cortez-mid-blazer-sail-deep-royal-blue-release-info>, Aug. 13, 2019, 12 pages.
Written Opinion of the International Preliminary Examining Authority received for PCT Patent Application No. PCT/US2020/055543, dated May 12, 2021, 7 pages.
Dwyer, Ross, "Stranger Things x Nike "Upside Down" Collection Release Date", SneakerNews.com Available online at: <https://sneakernews.com/2019/08/12/stranger-things-nike-upside-down-collection-release-date/ >, Aug. 12, 2019, 5 pages.
Northman, Tora, "Nike's Latest Air Force 1 Reveals Hidden Colors", hypebae.com, Available online at: <https://hypebae.com/2020/4/nike-air-force-1-reveal-diy-peel-sneakers-hidden-colors>, Apr. 25, 2020, 7 pages.
Ruiz, Derick, "The Nike Air Force 1 "Reveal" Drops This Week", www.modern-notoriety.com, Available online at <https://www.modern-notoriety.com/nike-wmns-air-force-1-air-max-98-lx-tear-away-release-date/>, May 23, 2021, 21 pages.

* cited by examiner

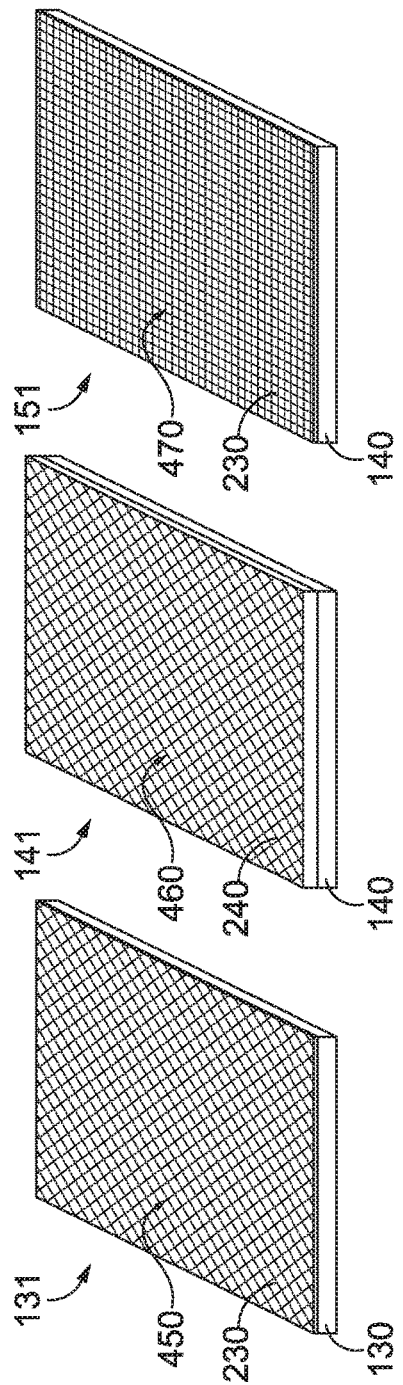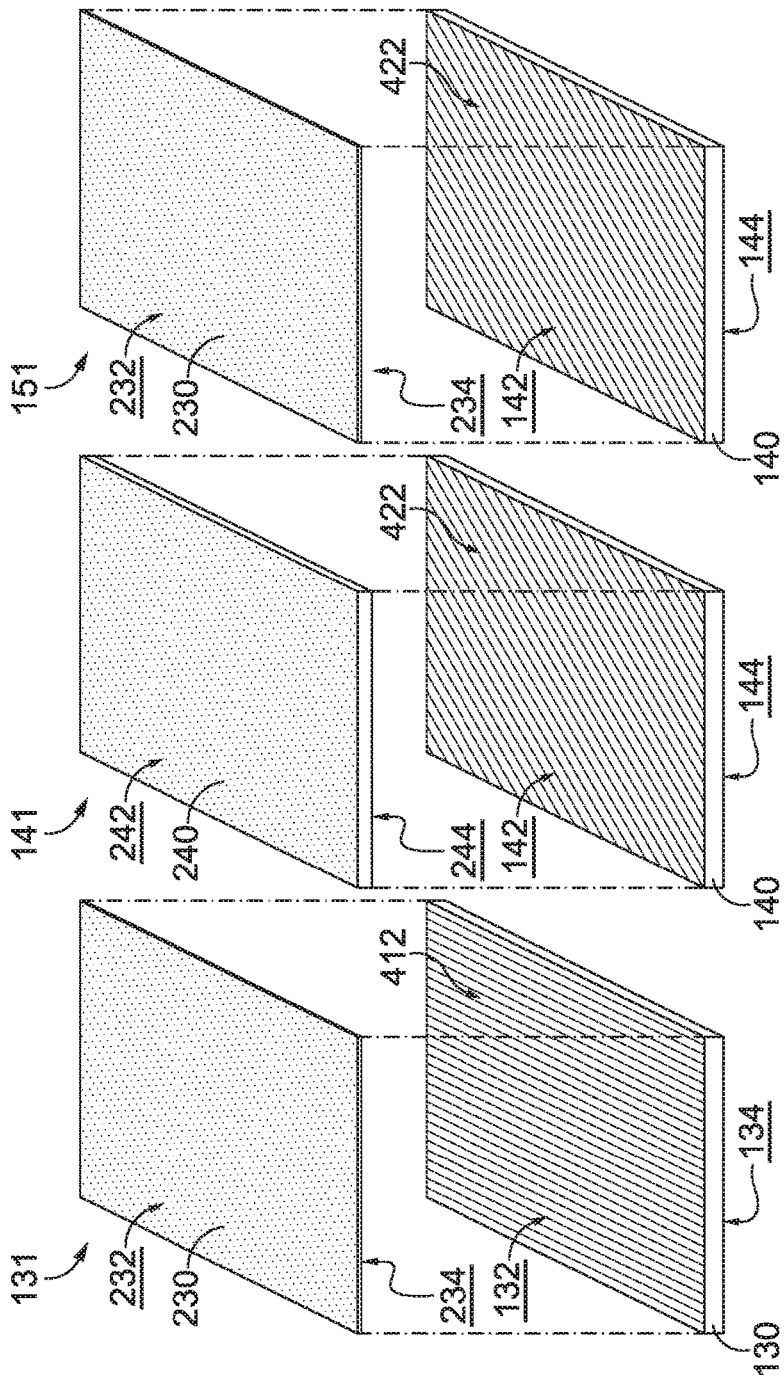

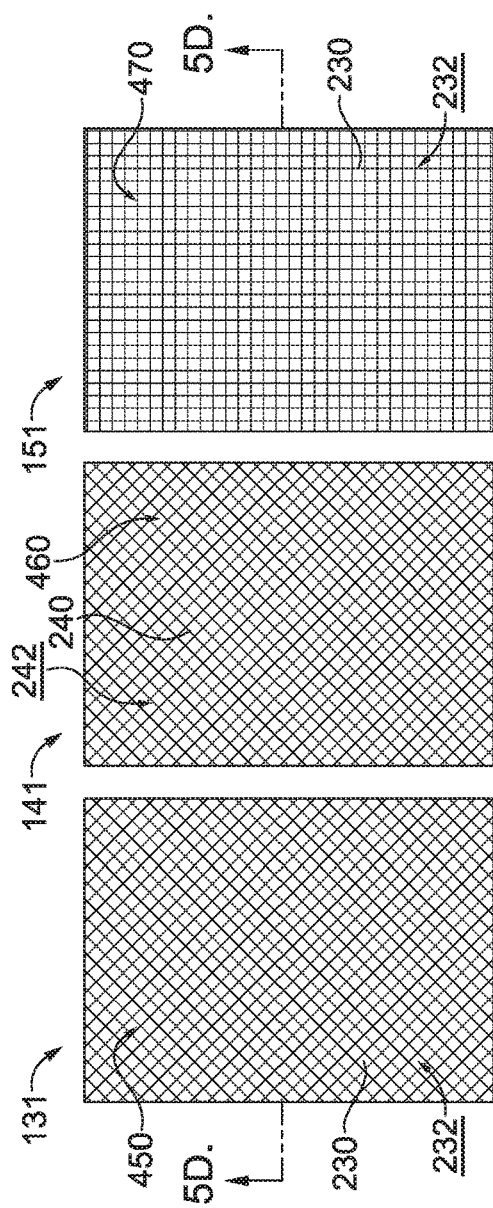
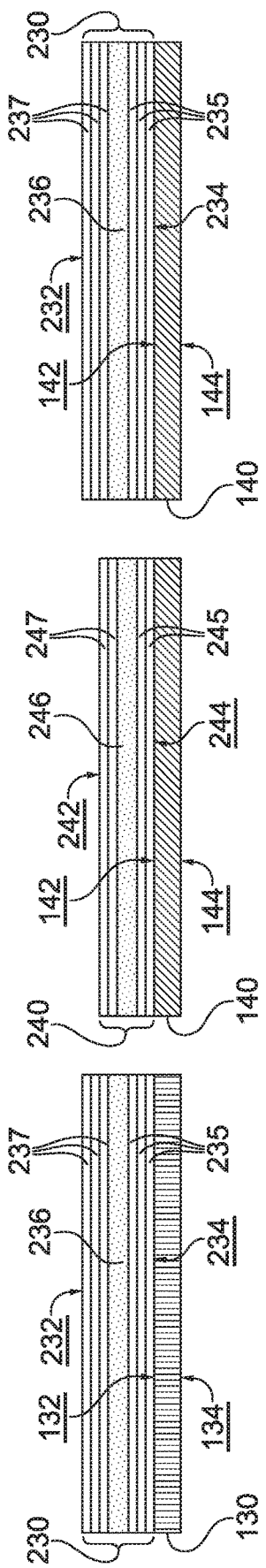
FIG. 5C
FIG. 5D

FOOTWEAR ARTICLE HAVING REPURPOSED MATERIAL WITH CONCEALING LAYER

TECHNICAL FIELD

This disclosure relates to materials obscured by a concealing layer and used to construct footwear articles.

BACKGROUND

Materials having various observable properties (e.g., color, surface texture, surface finish, etc.) may be used to manufacture footwear articles, including in the footwear upper, footwear sole, or any combination thereof. Sometimes, it may be desirable to obscure an observable property of a material (e.g., substrate), such as for design or other reasons. In addition, the ability to obscure an observable property of a material (at least temporarily) may permit the material to be used to construct a footwear article, when the material may not have otherwise been usable. However, conventional techniques for obscuring an observable property of a material may not produce a desired effect, such as when the color of the material affects a color of the concealing layer, when there are impediments to affixing a concealing layer to the material, or when it may be challenging to at least temporarily affix a concealing layer to the material for a desired duration.

Footwear-article manufacturing may be separated into multiple stages, such as a material-supply stage and a footwear-manufacturing stage. Typically, material suppliers source and/or produce materials, and footwear manufacturers use those materials to construct footwear articles. Materials produced or supplied for construction may include one or more characteristics (e.g., a color, composition, surface texture, thickness, etc.) that are specified or distinctive based on manufacturing standards, construction requirements, design specifications, etc. of a designated footwear article. These characteristics, however, may make it difficult for those already produced materials to be used to construct alternative footwear articles, which may not include the characteristics.

Additionally, materials are often supplied to footwear manufacturers in sufficient quantities to account for potential material losses (i.e., material lost from die cutting, construction errors, quality compliance, etc.) and to ensure that large-scale production runs of designated footwear articles can be completed. Because of this, large amounts of materials may be on hand during footwear construction, and as a result, excess materials are often (e.g., seasonally, annually, etc.) generated by routine changes in manufacturing circumstances and consumer demands that are associated with common events, such as holidays, seasonal weather changes, sporting competitions, and the like. Every so often, excess materials are also generated by unpredictable disruptions in supply chains, reductions in manufacturing capacity, and/or declines in consumer demands that are caused by rare events (e.g., natural disasters, global pandemics, shifts in public perception, etc.).

On account of the above, each stage associated with footwear manufacturing, from the supply chain on down, has a potential to generate substantial amounts of excess materials, such as overstock rolls, discontinued colorways, scraps, and the like. In some instances, storing excess materials may be cost-prohibitive and impractical, especially when the excess materials are of a large quantity and have characteristics (e.g., an uncommon color, surface finish, or material type that is part of a discontinued colorway or footwear design) that limit usefulness to construct other footwear articles not including those characteristics. Thus, excess materials are frequently returned to material suppliers and are often designated for disposal by materials suppliers (or other participants in the footwear-manufacturing chain), since the costs of storage may outweigh potential benefits. Consequently, much of the excess materials generated by footwear-article manufacturing end-up being disposed of (e.g., discarded, thrown away, incinerated, etc.) when a property (e.g., observable property such as color) of the material is not usable or desirable to be incorporated into a product.

BRIEF DESCRIPTION OF THE DRAWINGS

Some subject matter described in this disclosure is described in detail below with reference to the attached drawing figures, wherein:

FIG. 5A illustrates a perspective view of example substrates and example concealing layers including a structural-color element, in accordance with an aspect hereof;

FIG. 5B illustrates an exploded view of the substrates and concealing layers of FIG. 5A, in accordance with an aspect hereof;

FIG. 5C illustrates a top view of the substrates and concealing layers of FIG. 5A, in accordance with an aspect hereof;

FIG. 5D illustrates sectional views of the substrates and concealing layers of FIG. 5A taken along cut line 5D-5D of FIG. 5C, in accordance with an aspect hereof;

DETAILED DESCRIPTION

Figure 1:
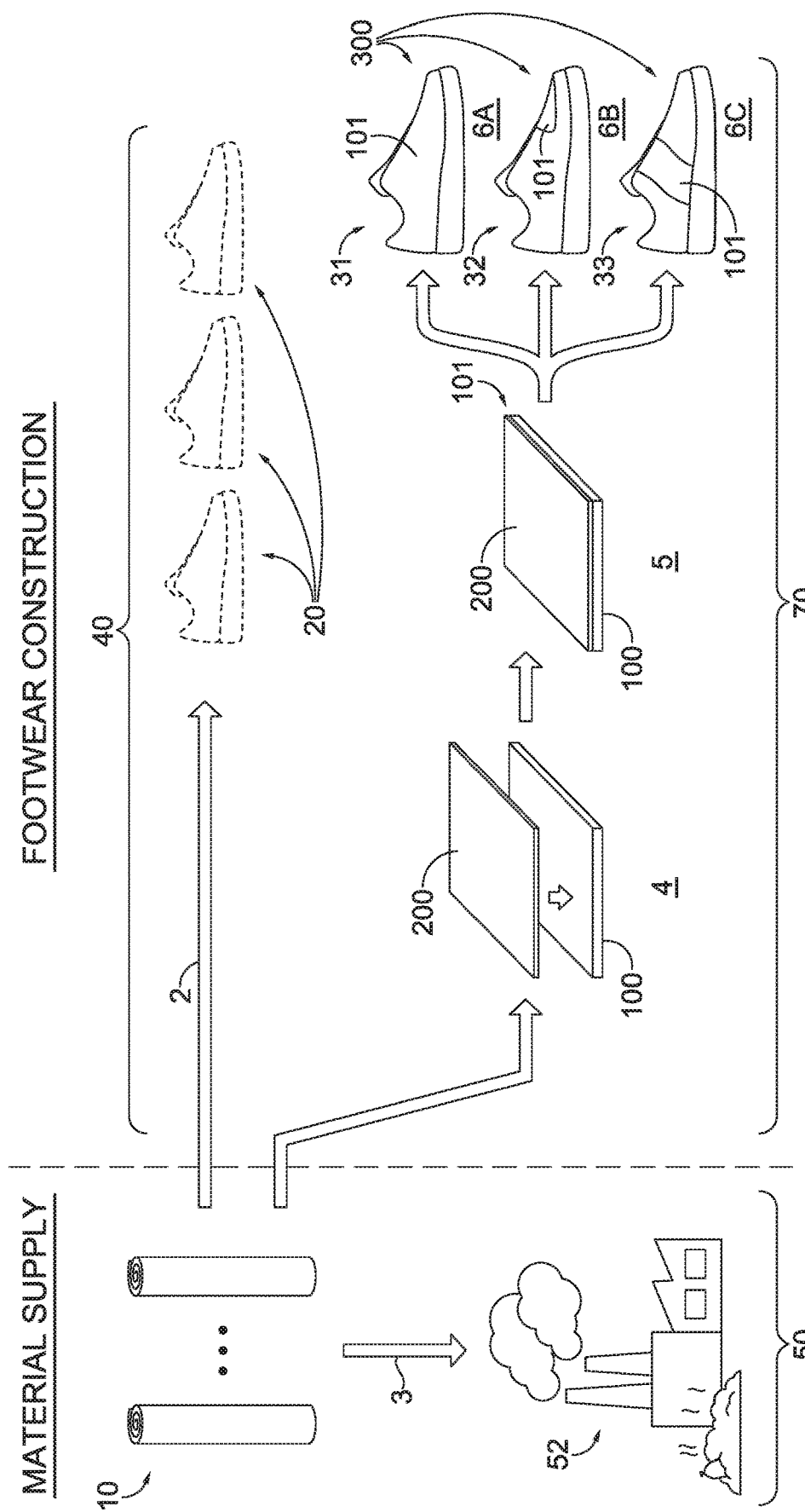
FIG. 1 illustrates some stages of footwear manufacturing in which a substrate is concealed with a concealing layer and is used to construct an array of footwear articles, in accordance with an aspect hereof.

Subject matter is described throughout this Specification in detail and with specificity in order to meet statutory requirements. The aspects described throughout this Specification are intended to be illustrative rather than restrictive, and the description itself is not intended necessarily to limit the scope of the claims. Rather, the claimed subject matter might be practiced in other ways to include different elements or combinations of elements that are equivalent to the ones described in this Specification and that are in conjunction with other present technologies or future technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

In general, an aspect of this disclosure relates to obscuring an observable property (e.g., visibly observable such as color, surface texture, surface finish, etc.) of a substrate (e.g., footwear upper material, footwear sole material, etc.) used to construct a footwear article. For example, a color of a substrate may be obscured in a manner that reduces the likelihood that the color of the substrate will affect the color of the concealing layer in an unintended or undesired manner. In other aspects, a color of a substrate material may be obscured in a manner that effectively affixes a concealing layer to the substrate. Moreover, aspects may include obscuring a color of a substrate in a manner that permits the concealing layer to be affixed to the substrate for a desired duration.

Furthermore, footwear-article manufacturing may utilize quantities of materials that are provided by a material supplier and used by a footwear manufacturer to construct a designated footwear article (e.g., a footwear article constructed of one or more textiles having distinctive characteristics). Footwear-article manufacturing may regularly generate excess materials from changes in manufacturing circumstances, consumer demands, and disruptions in supply chains. Absent aspects of the present disclosure, these excess materials may end-up being disposed of which may make the footwear-manufacturing process less sustainable (e.g., by adding to landfill waste, using additional resources for recycling, etc.). However, contrary to conventional approaches that would dispose of materials, aspects of the present disclosure provide methods, techniques, implementations, structures, and articles for repurposing materials in a footwear article. That is, the present disclosure provides a solution to obtain materials, which might otherwise be disposed of, and use those materials to construct a footwear article. In some instances, repurposing may include overlaying the material with a concealing layer to obscure a color of the previously to-be disposed of material such that, when included in a footwear article, an appearance of the previously to-be disposed of material is at least temporarily normalized. In a further aspect, repurposing may include a footwear article constructed of the to-be-disposed-of material that is overlaid with a concealing layer, and the concealing layer is abradable to surprisingly divulge a characteristic of the material to a consumer purchasing the footwear article. In accordance with aspects herein, materials that would have otherwise been disposed of and that were otherwise unusable, may be repurposed for footwear manufacturing, which results in less disposal of excess materials and, in turn, makes the process of footwear manufacturing more environmentally friendly.

At a high level, a repurposed material includes a material that was designated for disposal (e.g., discarding, throwing away, incineration, etc.) and that, prior to being disposed, is obtained and/or designated for manufacturing a footwear article. The material may have been designated by one or more various participants in stages of the footwear-manufacture process, including but not limited to, material suppliers, distributors, manufacturers, retailers, and the like. In addition, a material may be designated for disposal in various manners. For example, designation may include an explicit assignment or earmark to be disposed of. Alternatively, a material may be inherently designated for disposal, such as where the material has been stored longer than a threshold duration without being used or transferred to another entity in the footwear-manufacturing process, and the threshold duration may be 30 days, or alternatively 60 days, or alternatively 90 days, or alternatively 180 days.

In aspects, the repurposed material may also have been previously designated to manufacture a prior footwear article (e.g., discontinued footwear article, canceled footwear article, unlaunched design, etc.). In some instances, a repurposed material includes both the previously to-be-disposed-of material and a concealing layer configured to obscure, mask, modify, or alter one or more characteristics (e.g., color, thickness, surface texture, etc.) of the previously to-be-disposed-of material. As described above, the concealing layer may be configured to abrade in a manner such that the concealing layer in combination with a repurposed material may be included a footwear article to provide a user-customizable upper, a user-wear reveal, and/or a structural-color reveal.

To aid in the explanation of, and understanding of, aspects of this Specification, reference is now made to FIG. 1 to describe some stages of a method of manufacturing footwear 1 using material rolls 10. FIG. 1 includes brackets and arrows to depict various aspects of the stages, and because some of these aspects provide contextual information for individual stages for the method of manufacturing footwear 1, the aspects depicted by arrows 2, 3 and brackets 40, 50, 70 are first discussed.

As such, the arrow 2 illustrates that the material rolls 10 were previously designated to be used to manufacture footwear articles 20 (e.g., discontinued, prior season, prior colorway, anticipated but unfilled, etc.), and the arrow 3 illustrates that the material rolls 10 were previously designated to be disposed of, which, in this example, is by incineration 52. Brackets 40, 50, 70 each identify an entity involved in footwear-article manufacturing, which includes material suppliers and footwear manufacturers. Specifically, the brackets identify a material supply entity 50, a first footwear construction entity 40, and a second footwear construction entity 70.

Generally, the material supply entity 50 sources, produces, and/or provides materials, and the first and second footwear construction entities 40, 70 designate and use those materials to construct footwear articles. In the example of FIG. 1, the first footwear construction entity 40 (e.g., footwear manufacturer) designated, but did not use, the material rolls 10 to construct the array of footwear articles 20, and the first footwear construction entity 40, the material supply entity 50, or both designated the material rolls 10 for disposal. As previously described, the material rolls 10 may not have been used to construct the footwear articles 20 for various reasons, such as a style being discontinued, overstock, failure to launch, consumer trends, etc. Prior to disposal, the second footwear construction entity 70 acquires the material rolls 10 for the method of manufacturing footwear 1, at which point, the material rolls 10 are considered to be repurposed. In some instances, the second footwear construction entity 70 may be different than the first footwear construction entity 40. In other instances, the first and second footwear construction entities 40, 70 may be the same entity.

As shown in FIG. 1, manufacturing footwear articles 31, 32, and 33 includes a step 4 of obtaining a substrate 100 (e.g., a material panel) from the material rolls 10 that, in turn, was designated to be disposed of and was previously designated to be used to manufacture the footwear articles 20. The step 4 may also include designating the substrate 100 to be used to manufacture an array of footwear articles 300, which may occur before, after, or in conjunction with obtaining the substrate 100. Next, at a step 5, a concealing layer 200 is applied to a surface of the substrate 100, and in combination, the substrate 100 and the concealing layer 200 form a concealed material 101. The concealed material 101 is then used to construct footwear articles, such as the array of footwear articles 300, and this may be executed using various techniques or approaches. For example, at a step 6A, the concealed material 101 may be used to construct an entire upper of a first article 31. Alternatively or additionally, at a step 6B, the concealed material 101 may be used to construct a first portion of an upper of a second article 32. In a further aspect, alternatively or additionally to steps 6A and 6B, a step 6C may include the concealed material 101 being used to construct a different, second portion of an upper of a third article 33.

Although not depicted in FIG. 1, aspects herein contemplate that any of the steps 4, 5, 6A-C of the footwear manufacturing may be repeated or duplicated such that one or more additional material panels are obtained from the material rolls 10, combined with the concealing layer 200, and used to construct additional articles in the array of footwear articles 300. Moreover, aspects herein contemplate that the material rolls 10, as well as the substrate 100, may be a non-generic or differentiated material (e.g., having one or more unique or differentiating characteristics, such as color, surface texture, composition, construction, etc.) or a combination of two or more non-generic or differentiated materials having one or more characteristics. Likewise, the concealing layer 200 may also be a specified material or combination of two or more specified materials and may also have one or more characteristics (e.g., a tear-able fabric having a second color). It is further contemplated that these aspects of the material rolls 10, the substrate 100, and the concealing layer 200 may be combined in multiple ways to provide different versions of the concealed material 101. General discussions of such are immediately below, which are followed by specific examples that are discussed in connection with and illustrated by FIGS. 2A, 2B, and 5A-5D.

Beginning with a concealing layer, it is contemplated that, at high level, a concealing layer is configured to at least partially obscure a color and/or one or more characteristics of a substrate. These aspects contemplate that a concealing layer includes features that are sufficient to at least partially alter and/or obscure a visual appearance of a substrate that is observable at a surface of the substrate when the concealing layer is applied to that surface. In some instances, a concealing layer may optionally include a structural-color element. For example, a concealing layer may include only a structural-color element, or a concealing layer may include a structural-color element combined with some other element(s). Alternatively, a concealing layer may not include any structural-color element. These aspects, as well as others, of a concealing layer may depend on and/or relate to one or more characteristics of a substrate to which the concealing layer is applied. As such, aspects of a concealing layer may be explained by examples in which the concealing is combined with a substrate. Such examples are discussed below in connection with FIGS. 2A and 2B and are also later discussed in connection with FIGS. 5A-5D.

Turning now to aspects related to a substrate, at a high level, a substrate may include a color and one or more characteristics such as a composition, a basis weight, a thickness, a construction, and a surface topography. Generally, a substrate includes an externally facing surface and an internally facing surface, either or both of which may present a color of the substrate and/or may afford one or more characteristics to the substrate. For instance, a substrate may present color at an externally facing surface and/or may include a composition that defines at least a portion of the externally facing surface. Continuing, the substrate may also include a thickness that is a measurable distance between the externally facing surface and an internally facing surface. Aspects related to one or more characteristics of a substrate are discussed individually and with more detail below, and aspects related to a color of a substrate are later discussed.

Aspects herein contemplate that a composition of a substrate may include a one or more material types and/or combinations that are used to construct and/or that form the substrate. In such aspects, a composition may include any material manufactured from fibers, filaments, or yarns characterized by flexibility, fineness, and a high ratio of length to thickness. These aspects contemplate that a material may be one or more textiles, which generally fall into two categories. The first category includes textiles produced directly from webs of filaments or fibers by randomly interlocking to construct non-woven fabrics and felts. The second category includes textiles formed through a mechanical manipulation of yarn, thereby producing a woven fabric, a knitted fabric, a braided fabric, a crocheted fabric, and the like.

In further, related aspects, it is contemplated that a composition of a substrate may define at least a portion of a surface of the substrate (e.g., an externally facing surface, an internally facing surface, or both). That is, the composition is observable and/or present at a portion of substrate's surface. For instance, when a composition of a substrate includes a textile, at least some features of the textile are afforded to the surface of the substrate. Continuing, related aspects contemplate that a composition of a substrate may include a chemical formula. In such aspects, a chemical formula may be one that is associated with a material included in a substrate's composition. Some instances contemplate that a chemical formula is associated with a polymer included in a composition of a substrate that may or may not define a portion of the substrate's surface.

Aspects herein also contemplate that one or more characteristics of a substrate may include a basis weight. In such aspects, a basis weight may be determined by calculating a ratio of a substrate's weight (e.g., mass) and a substrate's size (e.g., surface area, volume). In other words, a basis weight (e.g., $g/cm^2$, $g/cm^3$) may be a weight of a substrate that has a given size. These aspects contemplate that a weight of a substrate may be determined by weighing a substrate and that a size of a substrate may be determined by measuring dimensions of a substrate (e.g., width, length, height, thickness, etc.) and then using those measured dimensions to calculate a specified size of the substrate using methods known by those having ordinary skill in the art. Similar aspects herein contemplate that one or more characteristics of a substrate may include a thickness of substrate, which, may be determined by measuring a distance between an externally facing surface and internally facing surface of a substrate.

Continuing, additional aspects herein contemplate that one or more characteristics of a substrate may include a surface topography. In these aspects, a surface topography may be a topography of substrate's externally facing surface, internally facing surface, or both. Generally, a surface topography may involve a lay of a surface, a surface roughness, and/or a waviness of a surface. The lay of a surface may be a direction of a predominant surface pattern of a substrate, which is typically dependent on a composition and/or construction of the substrate; a surface roughness may include closely spaced irregularities of a substrate's surface; and a waviness of a surface may include more widely spaced irregularities of a substrate's surface. Each of the foregoing may be determined using methods known by those having ordinary skill in the art, and once determined, a surface topography of a substrate's surface may include any combination of the lay, the roughness, and the waviness.

In other aspects, one or more characteristics of a substrate may include a construction of a substrate, and such aspects contemplate that a construction may include a formation or arrangement of one or more materials included in a composition of a substrate. These aspects also contemplate that a substrate's construction may include synthetic leather, a knit construction, a woven construction, a non-woven construction, a braided construction, or any combination thereof. In further aspects and as mentioned, a substrate may optionally be a repurposed material. These aspects contemplate that a repurposed material may include any one or combination of aspects related to a substrate discussed herein and are later discussed with more detail.

In even further aspects still, it is contemplated that a color and/or one or more characteristics of one substrate (e.g., a first substrate) are comparable to one or more characteristics of another, different substrate (e.g., a second substrates). Such aspects contemplate that a corresponding characteristic refers to a same characteristic of each substrate that is being compared. For instance, a corresponding characteristic of two, different substrates may be a construction of each substrate. In some aspects, a color and/or one or more characteristic of one substrate may be different than a color and/or one or more corresponding characteristics of a different substrate. Such aspects are more easily understood by way of example and thus, are further discussed in connection with FIGS. 2A, 2B, and 5A-5D.

Figure 2A:
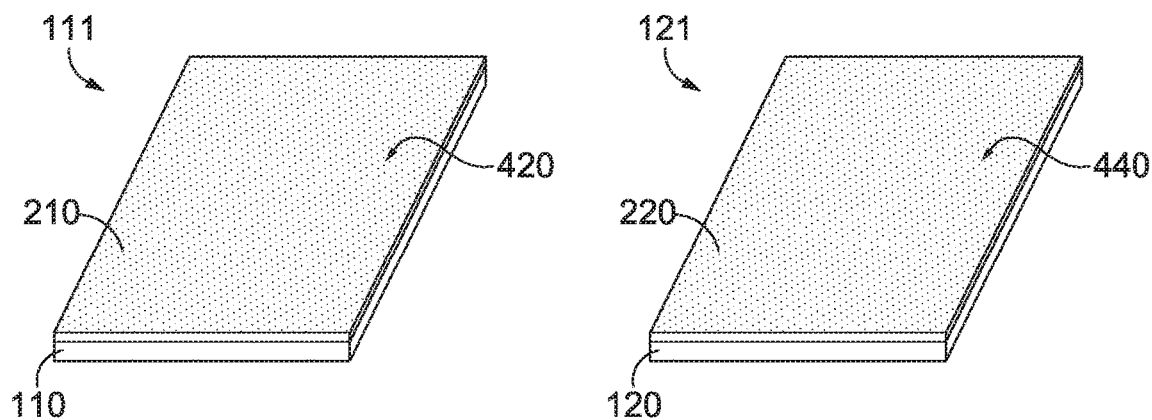
FIG. 2A illustrates a perspective view of example substrates with example concealing layers, in accordance with an aspect hereof.
Figure 2B:
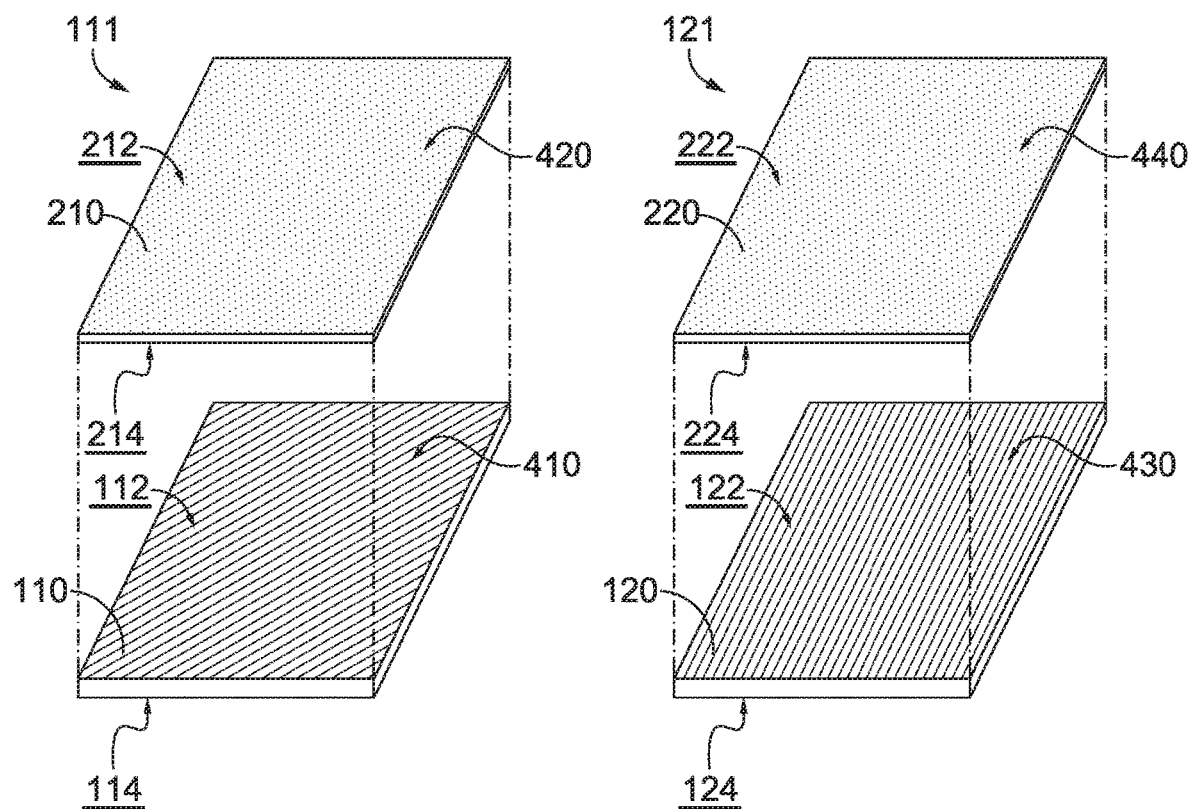
FIG. 2B illustrates an exploded view of the substrates and concealing layers of FIG. 2A, in accordance with an aspect hereof.

FIGS. 2A and 2B respectively illustrate a perspective view and an exploded view of example substrates and example concealing layers, in accordance with aspects hereof. When describing the various figures mentioned in this disclosure, like reference numbers refer to like components. As shown, a first concealed material 111 includes a first substrate 110 and a first concealing layer 210. Similarly, a second concealed material 121 includes a second substrate 120 and a second concealing layer 220. The first and second substrates 110, 120, the first and second concealing layers 210, 220, and in turn, the first and second concealed materials 111, 121 are depicted in a simplified fashion for discussion purposes but may be reshaped, duplicated, or reconfigured. Further, it is understood that these depictions are illustrative in nature and are not limiting. For example, the first and second substrates 110, 120 are illustrated as having similar, rectangular shapes, but it is contemplated that the first and second substrates 110, 120 may each have a different, irregular shape that forms a different part of a footwear article.

Although not illustratively depicted, the first substrate 110, the second substrate 120, or both are a repurposed material. As such, the first substrate 110 is a first repurposed material, and the second substrate 120 is a second repurposed material that is different than the first repurposed material. In turn, one or more characteristics of the first repurposed material are different than one or more corresponding characteristics of the second repurposed material. In aspects, it is contemplated that the first repurposed material and the second repurposed material may be a same material. In further aspects, it is contemplated that the first substrate 110, the second substrate 120, or both exclude a repurposed material.

The first substrate 110 is planar, has minimal thickness, and includes a first externally facing surface 112 (i.e., may potentially form an exterior surface or outward facing surface of a footwear article), a first internally facing surface 114 (i.e., may face towards the interior of a footwear article), and a first color 410 that is represented by a single hatching including lines with a positive slope. The first internally facing surface 114 opposes the first externally facing surface 112, and the first color 410 is presented at the first externally facing surface 112. Although not illustratively depicted, the first substrate 110 has a first characteristic including at least one of a first composition, a first basis weight, a first thickness, a first construction, and a first surface topography. The first composition of the first substrate 110 may be a textile material that includes one or more natural leathers, synthetic leathers, molded polymeric components, polymer foams, and the like. Further, in example aspects, the first composition of the first substrate 110 may include a material that is cut from a larger piece of material having two opposing surfaces and minimal thickness (e.g., an overstock material roll) that was previously designated to be disposed. In other aspects, the first construction of the first substrate 110 may include a formed-to-shape material, such as a knit, woven, braided, non-woven material that is formed in a generic shape or in a specific shape, such as a shape included as part of pattern in an upper portion of a footwear article.

The first concealing layer 210, like the first substrate 110, is planar but not necessarily rigid, has a thickness that is less than that of the first substrate 110, and includes a first outwardly facing surface 212, a first inwardly facing surface 214, and a second color 420 that is represented by multiple dots. The first outwardly facing surface 212 is positioned opposite the first inwardly facing surface 214 and presents the second color 420. As indicated in FIGS. 2A and 2B, the first concealing layer 210 overlays the first substrate 110 such that the first inwardly facing surface 214 of the first concealing layer 210 is adjacent to and in contact with the first externally facing surface 112 of the first substrate 110. In example aspects, the first concealing layer 210 is disposed (e.g., affixed, attached, adhered, bonded, joined) on the first externally facing surface 112 and is configured to obscure the first color 410 of the first substrate 110.

The second substrate 120 and the second concealing layer 220 have features that are similar to those of the first substrate 110 and the first concealing layer 210. As such, the second substrate 120 is planar, has minimal thickness, and includes a second externally facing surface 122, a second internally facing surface 124, and a third color 430 that is represented by a single hatching including vertical lines. The second internally facing surface 124 and the second externally facing surface 122 oppose one another, and the third color 430 is presented at the second externally facing surface 122. Even though it is not illustratively depicted, the second substrate 120 has a second characteristic including at least one of a second composition, a second basis weight, a second thickness, a second construction, and a second surface topography. The second composition of the second substrate 120 may be a textile material that includes one or more natural leathers, synthetic leathers, molded polymeric components, polymer foams, and the like. Further, in example aspects, the second composition of the second substrate 120 may include a material that is cut from a larger piece of material having two opposing surfaces and minimal thickness (e.g., an overstock material roll) that was previously designated to be disposed. In other aspects, the second construction of the second substrate 120 may include a formed-to-shape material, such as a knit, woven, braided, non-woven material that is formed in a generic shape or in a specific shape, such as a shape included as part of pattern in an upper portion of a footwear article.

In additional example aspects, the first characteristic of the first substrate 110 is different than the corresponding second characteristic of the second substrate 120. In one example, the first characteristic of the first substrate 110 includes the first construction, and the second characteristic of the second substrate 120 includes the second construction, which is different than the first construction. In other examples, the first characteristic of the first substrate 110 includes the first composition, and the second characteristic of the second substrate 120 includes the second composition, which is different than the first composition. In another example, the first characteristic of the first substrate 110 includes the first basis weight, and the second characteristic of the second substrate 120 includes the second basis weight, which is different than the first basis weight. In yet another example, the first characteristic of the first substrate 110 includes the first thickness, and the second characteristic of the second substrate 120 includes the second thickness, which is different than the first thickness. In yet another example still, the first characteristic of the first substrate 110 includes the first surface topography, and the second characteristic of the second substrate 120 includes the second surface topography, which is different than the first surface topography. Additional examples contemplated herein are provided later.

The second concealing layer 220 is planar but not necessarily rigid, has a thickness that is less than that of the second substrate 120, and includes a second outwardly facing surface 222, a second inwardly facing surface 224, and a fourth color 440 that is represented by multiple dots. The second outwardly facing surface 222 is positioned opposite the second inwardly facing surface 224 and presents the fourth color 440. The second concealing layer 220 overlays the second substrate 120 such that the second inwardly-facing surface 224 of the second concealing layer 220 is adjacent to and in contact with the second externally facing surface 122 of the second substrate 120. In example aspects, the second concealing layer 220 is disposed (e.g., affixed, attached, adhered, bonded, joined) on the second externally facing surface 122 and is configured to obscure the third color 430 of the second substrate 120.

The first concealing layer 210 and the second concealing layer 220 may include a variety of different constructions. In one aspect, the concealing layers may include a layer of material that obscures a color of underlying substrates (e.g., repurposed materials) at a first instant in time and that is abradable, or otherwise wears away, to present the color at a second instant in time. In other words, the first concealing layer 210 is to abrade at a rate that is greater than the first substrate 110 and, likewise, the second concealing layer 220 is to abrade at a rate that is greater than the second substrate 120 such that an obscuring of the first and second substrates 110, 120 diminishes over time. For example, the concealing layers may obscure the color of the repurposed textile when the repurposed textile is incorporated into a footwear article at a point of sale and may abrade or wear away at some point after the sale. In In some instances, the concealing layer may wear away through use (e.g., wear by a consumer). For example, the point after the sale at which the concealing layer wears away may be at least 10 wear cycles; or alternatively at least 50 wear cycles; or alternatively at least 100 wear cycles. In another instance, the point after the sale at which the concealing layer wears away may be more than 10 wear cycles and less than 50 wear cycles; or alternatively more than 50 wear cycles and less than 150 wear cycles; or alternatively more than 100 wear cycles and less than 400 wear cycles. In an alternative embodiment, wear cycles is measured using the method for determining abradability described in this disclosure. In some instances, the concealing layer may be applied at a first instant in time (e.g. at the point of sale) providing the initial aesthetically appealing color, and the concealing layer may be removed, for example, by abrading or wearing away during normal wear of the article, such that a color of the substrate (e.g., a repurposed material) is gradually exposed over time, or at a later instant in time to provide an appealing, color-exposing experience. In some aspects, a consumer can initiate or accelerate removal of the concealing layer from the substrate (e.g., actively remove). Removal of the concealing layer can include scratching, scraping, cutting, sanding, burning, peeling, or dissolving the concealing layer.

The concealing layers may include a variety of different materials, such as tissue paper, metallic film, flocking, metallic deposit, etc. In one example, the first substrate 110 combined with the first concealing layer 210 may include a two-layer woven textile such that each of the first substrate 110 and the first concealing layer 210 form one layer of the two-layer textile, and the first concealing layer 210 is an outermost layer that is less densely woven than the other layer. In another example, the second substrate 120 combined with the second concealing layer 220 may include a two-layer woven textile such that each of the second substrate 120 and the second concealing layer 220 form one layer of the two-layer textile and the second concealing layer 220 is an outermost layer that is less densely woven than the other layer. In yet another example, both the first substrate 110 combined with the first concealing layer 210 and the second substrate 120 combined with the second concealing layer 220 may include a two-layer woven textile in accordance with the aforementioned aspects. In other examples, the first concealing layer, the second concealing layer, or both include a structural-color element, as is described in other parts of this disclosure.

Figure 3:
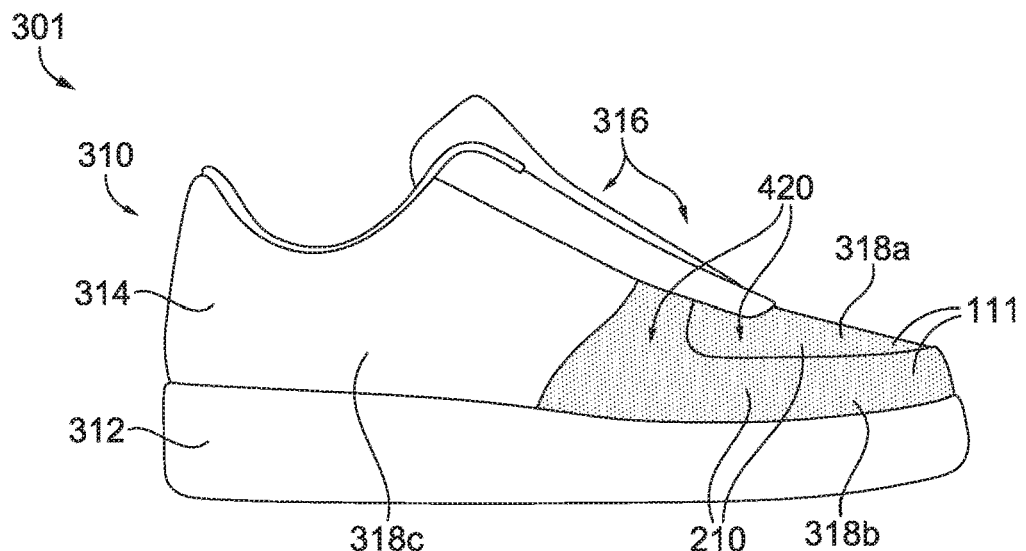
FIG. 3 illustrates a side view of an example first array of colored footwear articles, in accordance with an aspect hereof.
Figure 3:
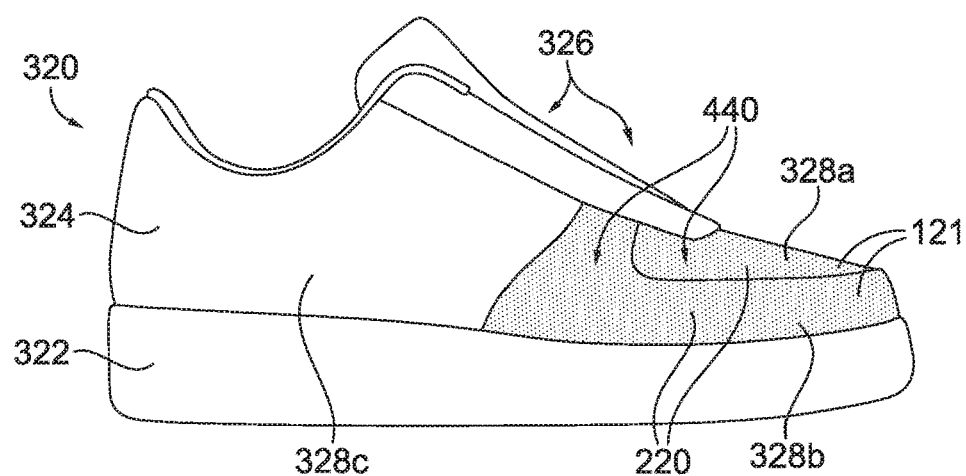
Figure 3:
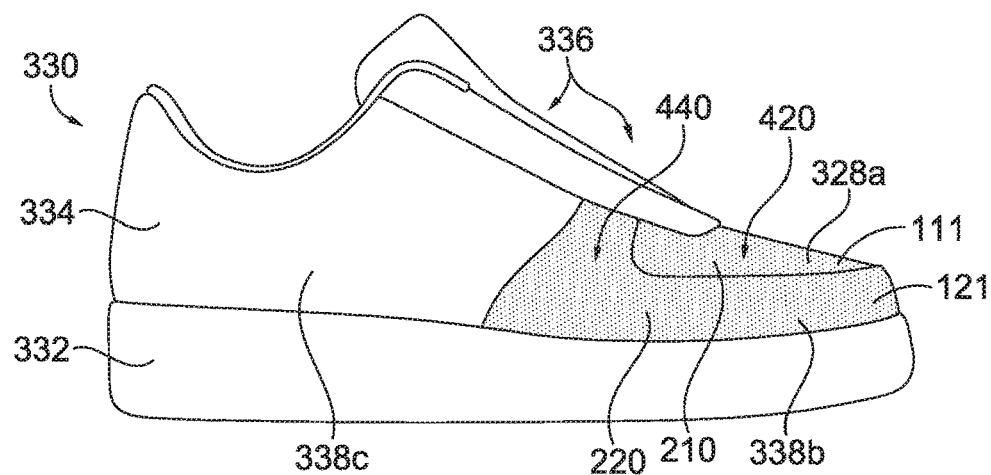

An aspect of the present disclosure is directed to an array of footwear articles having one or more repurposed materials. Referring now to FIG. 3, FIG. 3 illustrates a lateral side of each footwear article of an example first array of colored footwear articles 301. As shown, the first array of colored footwear articles 301 includes a first footwear article 310, a second footwear article 320, and a third footwear article 330. In FIG. 3, each footwear article 310, 320, 330 includes one or more concealed materials, and referring briefly to FIG. 4, each footwear article 310, 320, 330 is depicted with the one or more concealed materials being at least partially abraded.

Each of the first, second, and third footwear articles 310, 320, 330 include similar elements. As depicted in FIG. 3, the first footwear article 310 includes a first sole structure 312 and a first upper 314, the second footwear article 320 includes a second sole structure 322 and a second upper 324, and the third footwear article 330 includes a third sole structure 332 and a third upper 334. When each of the first, second, and third footwear articles 310, 320, 330 is worn (as intended on a foot), the first, second, and third sole structures 312, 322, 333 are typically positioned near the foot plantar surface (i.e., the bottom of the foot). The first, second, and third sole structures 312, 322, 333 may protect the bottom of the foot, and in addition, may attenuate ground-reaction forces, absorb energy, provide traction, and control foot motion, such as pronation and supination. The first upper 314 is coupled to the first sole structure 312, the second upper 324 is coupled to the second sole structure 322, and the third upper 334 is coupled to the third sole structure 332. Each of the first, second, and third uppers 314, 324, 334 forms a foot-receiving cavity (not shown) with a sole structure of their respective footwear article. That is, while each of the first, second, and third sole structures 312, 322, 332 typically encloses the bottom of the foot, each of the first, second, and third uppers 314, 324, 334 extends over, and at least partially covers, a dorsal portion of the foot (i.e., the top of the foot or the instep) and secures each of the first, second, and third footwear articles 310, 320, 330 to the foot. Each of the first, second, and third uppers 314, 324, 334 also include a foot-insertion opening (not shown), through which a foot is inserted when the first footwear article 310 is put on as the foot is arranged into the foot-receiving cavity.

Although not identified in FIG. 3, each of the first, second, and third footwear articles 310, 320, 330 includes regions that correspond with portions of the foot. That is, each of the first, second, and third footwear articles 310, 320, 330 includes a forefoot region, a midfoot region, a heel region, and an ankle region. The forefoot region, the midfoot region, and the heel region of each of the first, second, and third footwear articles 310, 320, 330 extend through a sole structure and an upper of their respective footwear article (e.g., the first, second, and third sole structures 312, 322, 332). Each of the ankle regions is located in a portion of an upper of their respective footwear articles (e.g. the first, second, and third uppers 314, 324, 334). Each of the forefoot regions generally includes portions of their respective footwear article (e.g., the first, second, and third footwear articles 310, 320, 330) corresponding with the toes and the joints connecting the metatarsals with the phalanges. Each of the midfoot regions generally includes portions of their respective footwear article (e.g., the first, second, and third footwear articles 310, 320, 330) corresponding with the arch area and instep of the foot. Each of the heel regions corresponds with rear portions of the foot, including the calcaneus bone. Each of the ankle regions corresponds with the ankle. The forefoot region, the midfoot region, the heel region, and the ankle region describe general areas of their respective footwear article (e.g., the first, second, and third footwear articles 310, 320, 330) to aid in the understanding of various aspects of this Specification.

Each of the first, second, and third footwear articles 310, 320, 330 also has a lateral side (visible in FIG. 3 but not identified) and a medial side (obscured from view and not identified in FIG. 3). The lateral side and the medial side extend through each of the forefoot region, the midfoot region, the heel region, and the ankle region, and correspond with opposite sides of the first footwear article 310. The lateral side 318 is thus considered opposite to the medial side. Typically, the lateral side corresponds with an outside area of the foot (i.e., the surface that faces away from the other foot), and the medial side corresponds with an inside area of the foot (i.e., the surface that faces toward the other foot). In another aspect, the first footwear article 310 includes an anterior portion and a posterior portion falling on an opposite side of a latitudinal midline plane (not depicted) of the first footwear article 310, as is understood by those skilled in the art. In addition, these terms may also be used to describe relative positions of different structures. For example, a first structure that is closer to the inside portion of the footwear article might be described as medial to a second structure, which is closer to the outside area and is more lateral.

The first, second, and third sole structures 312, 322, 332 may be constructed of various materials and may include various elements. In some aspects, first, second, and third sole structures 312, 322, 332 may each include a midsole and an outsole. The midsole may be formed from a compressible polymer foam element (e.g., a polyurethane or ethylvinylacetate (EVA) foam) that attenuates ground reaction forces (i.e., provides cushioning) when compressed between the foot and the ground during walking, running, or other ambulatory activities. In further aspects, the midsole may incorporate fluid-filled chambers, plates, moderators, or other elements that further attenuate forces, enhance stability, or influence motions of the foot. The midsole may be a single, one-piece midsole, or could be multiple components integrated as a unit. In some aspects, the midsole may be integrated with the outsole as a unisole. The outsole may be one-piece, or may be several outsole components, and may be formed from a wear-resistant rubber material that may be textured to impart traction and/or may include traction elements such as tread or cleats secured to the midsole. The outsole may extend either the entire length and width of the sole or only partially across the length and/or width.

Each of the first, second, and third uppers 314, 324, 334 typically includes a portion that overlaps with, and is connected to, a sole structure of their respective footwear article (i.e., the first, second, and third sole structures 312, 322, 332). Each of the first, second, and third sole structures 312, 322, 332 and the junction of their respective connection may be referred to as a biteline. In addition, the first, second, and third uppers 314, 324, 334 may each include a "strobel," which includes a material panel extending from each of the first, second, and third uppers 314, 324, 334 and across at least a portion of a foot-facing surface of a sole structure of their respective footwear article (i.e., the first, second, and third sole structures 312, 322, 332). Stated differently, each of the first, second, and third sole structures 312, 322, 332 includes a foot-facing surface, and in some instances, each of the first, second, and third uppers 314, 324, 334 may include a panel (referred to as a strobel) that extends inward from near the biteline region and at least partially covers the foot-facing surface. In that instance, the strobel is positioned underneath a foot when the footwear article is worn. The strobel may be covered by an insole or other layer of material.

Figure 4:
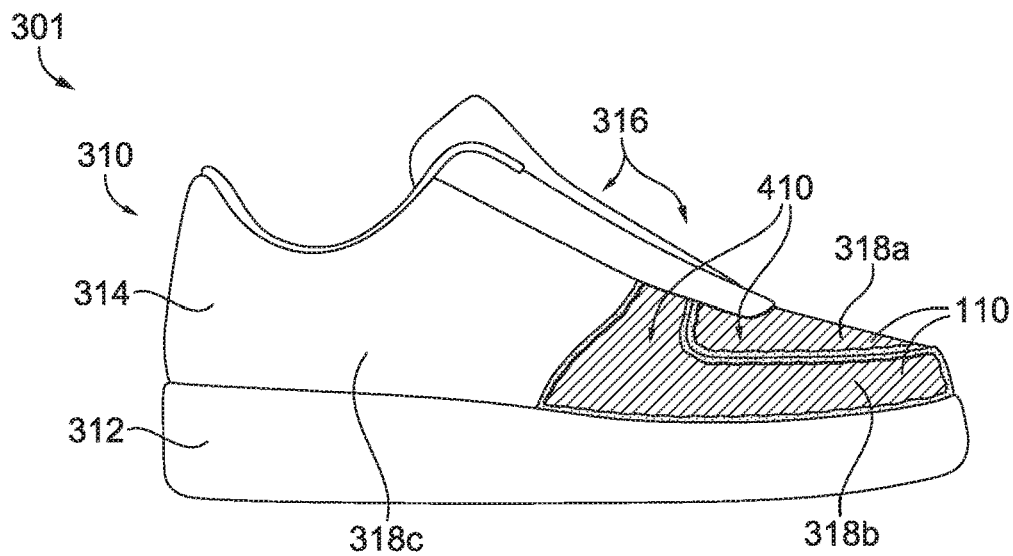
FIG. 4 illustrates a side view of the first array of colored footwear articles of FIG. 3 and depicts a concealing layer of each footwear article as partially abraded, in accordance with an aspect hereof.
Figure 4:
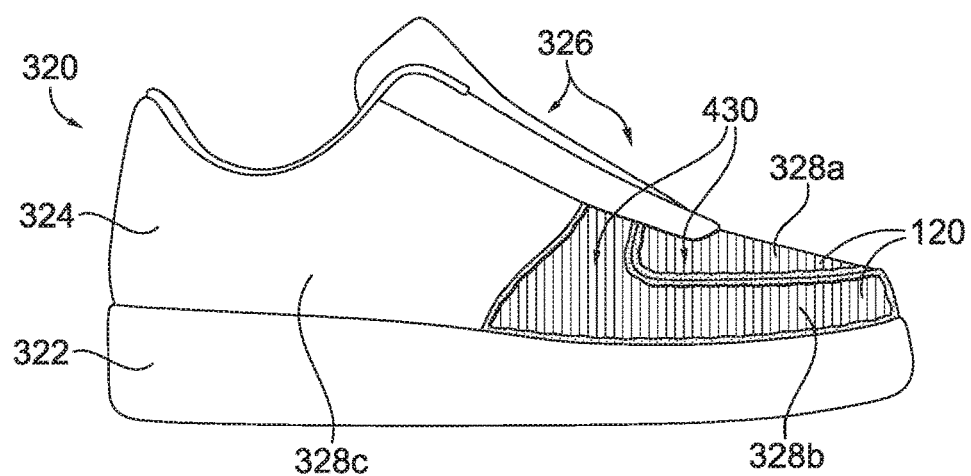
Figure 4:
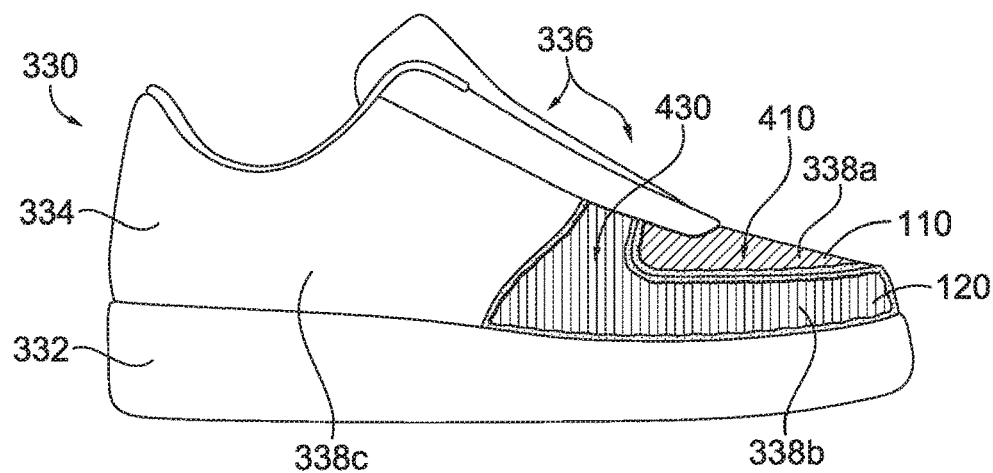

Additional reference is now made to FIG. 4 together with FIG. 3 to describe the array of colored footwear articles 301, and FIG. 4 which illustrates a lateral side of each footwear article side of the first array of colored footwear articles 301 and depicts a concealing layer of each of the first, second, and third footwear articles 310, 320, 330 as abraded. Focusing on the first footwear article 310, the first upper 314 is constructed of multiple panels that are joined together (e.g., stitched, affixed, bonded, glued, etc.) and arranged in a first pattern of panels 316. In FIGS. 3 and 4, three portions of the first upper 314 are identified, which collectively form the first pattern of panels 316: a first toe portion 318A, a first forefoot portion 318B, and a first heel portion 318C. The first toe portion 318A and the first forefoot portion 318B are constructed from the first concealed material 111 (identified in FIG. 3), and the features of the first substrate 110 (discussed above in connection with FIGS. 2A and 2B) are included at these portions of the first upper 314. Thus, at the first toe portion 318A and the first forefoot portion 318B, the first upper 314 includes the first substrate 110 (identified in FIG. 4 and obscured from view in FIG. 3) and the first concealing layer 210 (identified in FIG. 3 and abraded in FIG. 4). In FIG. 3, the first color 410 of the first substrate 110 is obscured from view, and the second color 420 of the first concealing layer 210 is presented at the first toe portion 318A and the first forefoot portion 318B. In FIG. 4, the first concealing layer 210 has abraded such that the first color 410 of the first substrate 110 is presented.

In accordance with aspects herein and as is depicted by the differing representations of the first color 410 of the first substrate 110 and the second color 420 of the first concealing layer 210 in FIGS. 2A-4, it is contemplated that the first color 410 and the second color 420 are visually different. Although not depicted, it is also contemplated that the first color 410 and the second color 420 may be visually similar. As discussed below, whether the first color 410 and the second color 420 are visually different or similar may be determined using methods and calculations described herein.

While a construction of the first heel portion 318C is not illustratively depicted in FIGS. 3 and 4, aspects herein contemplate that the first heel portion 318C may be constructed in a manner that is similar to the first toe portion 318A or the first forefoot portion 318B and thus, may include a substrate with one or more characteristics that is similar to first substrate 110 or the second substrate 120. Such aspects contemplate that the first heel portion 318C may include the first concealed material 111, the second concealed material 121, or both and also contemplate that the first heel portion 318C may only include the first substrate 110 or the second substrate 120. Other aspects contemplate that the first heel portion 318C may include a concealed material and/or a substrate that is different than the first and second concealed materials 111, 121 and/or the first and second substrates 110, 120. As such, the first heel portion 318C may include a substrate that includes any combination of the one or more first and second characteristics of the first and second substrates 110, 120, including the first and second compositions, the first and second basis weights, the first and second thicknesses, the first and second constructions, the first and second surface topographies, or any combination thereof. In other aspects the first heel portion 318C may include a substrate that has at least one characteristic that is different than the corresponding first or second characteristic of the first and second substrates. Other aspects contemplate that the first heel portion 318C may also include a substrate that is a repurposed material or may include a substrate that excludes a repurposed material and/or may or may not be concealed. For example, the first heel portion 318C may be constructed of a substrate that has not been repurposed (i.e., a textile that was not previously designated to be disposed of) and is not concealed with a concealing layer.

Focusing now on the second footwear article 320, the second upper 324 includes features that are similar to first upper 314 and is also constructed of multiple panels that are joined together (e.g., stitched, affixed, bonded, glued, etc.) and arranged in a second pattern of panels 326, which is similar to the first pattern of panels 316. The second pattern of panels 326 includes: a second toe portion 328A, a second forefoot portion 328B, and a second heel portion 328C. The second toe portion 328A and the second forefoot portion 328B are constructed from the second concealed material 121 (identified in FIG. 3), and because of this, features of the second concealed material 121 (discussed above in connection with FIGS. 2A and 2B) are included at these portions of the second upper 324. Accordingly, at the second toe portion 328A and the second forefoot portion 328B, the second upper 324 includes the second substrate 120 (identified in FIG. 4 and obscured from view in FIG. 3) and the second concealing layer 220 (identified in FIG. 3 and abraded in FIG. 4). In FIG. 3, the third color 430 of the second substrate 120 is obscured from view, and the fourth color 440 of the second concealing layer 220 is presented at the second toe portion 328A and the second forefoot portion 328B. In FIG. 4, the second concealing layer 220 has abraded such that the third color 430 of the second substrate 120 is presented.

In accordance with aspects herein and as is depicted by the differing representations of the third color 430 of the second substrate 120 and the fourth color 440 of the second concealing layer 220 in FIGS. 2A-4, it is contemplated that the third color 430 and the fourth color 440 are visually different. Although not depicted, it is also contemplated that the third color 430 and the fourth color 440 may be visually similar. As discussed below, whether the third color 430 and the fourth color 440 are visually different or similar may be determined using methods and calculations described herein.

In FIGS. 3 and 4, a material construction of the second heel portion 328C is not illustratively depicted, but aspects herein contemplate that the second heel portion 328C may be constructed in a manner that is similar to the second toe portion 328A or the second forefoot portion 328B and thus, may include a substrate with one or more characteristics that is similar to first substrate 110 or the second substrate 120. Such aspects contemplate that the second heel portion 328C may include the first concealed material 111, the second concealed material 121, or both and also contemplate that the second heel portion 328C may only include the first substrate 110 or the second substrate 120. Other aspects contemplate that the second heel portion 328C may include a concealed material and/or a substrate that is different than the first and second concealed materials 111, 121 and/or the first and second substrates 110, 120. As such, the second heel portion 328C may include a substrate that includes any combination of the one or more first and second characteristics of the first and second substrates 110, 120, including the first and second compositions, the first and second basis weights, the first and second thicknesses, the first and second constructions, the first and second surface topographies, or any combination thereof. In other aspects the second heel portion 328C may include a substrate that has at least one characteristic that is different than the corresponding first or second characteristic of the first and second substrates. In further aspects, the second heel portion 328C may also include a substrate that is a repurposed material or may include a substrate that excludes a repurposed material and/or may or may not be concealed. For example, the second heel portion 328C may be constructed of a substrate that has not been repurposed (i.e., a textile that was not previously designated to be disposed of) and is not concealed with a concealing layer.

Turning now to the third footwear article 330, the third upper 334 includes features that are similar to the first and second uppers 314, 324 and is also constructed of multiple panels that are joined together (e.g., stitched, affixed, bonded, glued, etc.) and arranged in a third pattern of panels 336. Like the first and second pattern of panels 316, 326, the third pattern of panels 336 includes: a third toe portion 338A, a third forefoot portion 338B, and a third heel portion 338C. However, in the third pattern of panels 336, the third toe portion 338A is constructed from the first concealed material 111 (identified in FIG. 3) and the third forefoot portion 338B is constructed from the second concealed material 121 (identified in FIG. 3). As such, features of the first concealed material 111 (discussed above in connection with FIGS. 2A and 2B) are included at the third toe portion 338A of the third upper 334. Similarly, features of the second concealed material 121 (discussed above in connection with FIGS. 2A and 2B) are included at the third forefoot portion 338B of the third upper 334.

Thus, at the third toe portion 338A, the third upper 334 includes the first substrate 110 (identified in FIG. 4 and obscured from view in FIG. 3) and the first concealing layer 210 (identified in FIG. 3 and abraded in FIG. 4), and at the third forefoot portion 338B, the third upper 334 includes the second substrate 120 (identified in FIG. 4 and obscured from view in FIG. 3) and the second concealing layer 220 (identified in FIG. 3 and abraded in FIG. 4). In FIG. 3, the first color 410 of the first substrate 110 and the third color 430 of the second substrate 120 are obscured from view, the second color 420 of the first concealing layer 210 is presented at the third toe portion 338A, and the fourth color 440 of the second concealing layer 220 is presented at the third forefoot portion 338B. In FIG. 4, the first and second concealing layers 210, 220 have abraded such that the first color 410 of the first substrate 110 and the third color 430 of the second substrate 120 are presented.

In example aspects and as is depicted by the differing representations of the first color 410 of the first substrate 110 and the third color 430 of the second substrate 120 in FIGS. 2A-4, it is contemplated that the first color 410 and the third color 430 are visually different. Moreover, in other example aspects and as is also depicted by the same representations of the second color 420 of the first concealing layer 210 and the fourth color 440 of the second concealing layer 220 in FIGS. 2A-4, it is also contemplated that the second color 420 and the fourth color 440 may be visually similar. Further, in yet another example aspect, which is also depicted by the differing representations of the first color 410, the third color 430, and the second and fourth colors 420, 440, it is contemplated herein that both the first and third colors 410, 430 are visually different than the second and fourth colors 420, 440. Considering these aspects collectively, it is contemplated that the second and fourth colors 420, 440 are visually similar and may obscure the first and third colors 410, 430, which are visually different from one another and the second and fourth colors 420, 440, to present a uniform or normalized color appearance. Continuing, upon removal of the first and second concealing layers 210, 220 (e.g., abrading or wearing away during normal wear, active removal by a wearer including scratching, scraping, cutting, sanding, burning, peeling, or dissolving the concealing layer, etc), the obscuring by the second and fourth colors 420, 440 is reduced and the first and third colors 410, 430 are presented, thereby diminishing the uniform or normalized color appearance presented by the second and fourth colors 420, 440. As discussed below, whether the first, second, third, and fourth colors 410, 420, 430, 440 are visually different or similar may be determined using methods and calculations described herein.

While a material construction of the third heel portion 338C is not illustratively depicted in FIGS. 3 and 4, aspects herein contemplate that the third heel portion 338C may be constructed in a manner that is similar to the third toe portion 338A or the third forefoot portion 338B and thus, may include a substrate with one or more characteristics that is similar to first substrate 110 or the second substrate 120. Such aspects contemplate that the third heel portion 338C may include the first concealed material 111, the second concealed material 121, or both and also contemplate that the third heel portion 338C may only include the first substrate 110 or the second substrate 120. Other aspects contemplate that the third heel portion 338C may include a concealed material and/or a substrate that is different than the first and second concealed materials 111, 121 and/or the first and second substrates 110, 120. As such, the third heel portion 338C may include a substrate that includes any combination of the one or more first and second characteristics of the first and second substrates 110, 120, including the first and second compositions, the first and second basis weights, the first and second thicknesses, the first and second constructions, the first and second surface topographies, or any combination thereof. In other aspects the third heel portion 338C may include a substrate that has at least one characteristic that is different than the corresponding first or second characteristic of the first and second substrates. In even other aspects, the third heel portion 338C may also include a substrate that is a repurposed material or may include a substrate that excludes a repurposed material and/or may or may not be concealed. For example, the third heel portion 338C may be constructed of a substrate that has not been repurposed (i.e., a textile that was not previously designated to be disposed of) and is not concealed with a concealing layer.

In other aspects, the first, second, and third footwear articles 310, 320, 330 might include an athletic-type shoe, such as might be worn when running or walking, and the description of the first, second, and third footwear articles 310, 320, 330, including the elements described with respect to FIG. 3, might also be applicable to other types of shoes, such as basketball shoes, tennis shoes, American football shoes, soccer shoes, leisure or casual shoes, dress shoes, work shoes, a sandal, a slipper, a boot, hiking shoes, and the like.

As mentioned above, in one aspect of the present disclosure, a concealing layer includes a structural-color element. In general, structural color is caused by the physical interaction of light with the micro- or nano-features of a surface and/or with layers of a concealing layer and/or an underlying substrate, as compared to color derived from the presence of dyes or pigments that absorb or reflect specific wavelengths of light based on the chemical structures of the dyes or pigments. As such, a concealing layer comprising a structural-color element with a set of layers (e.g., one or more structural-color layers) may exhibit one or more structural colors, which are visible colors produced, at least in part, through optical effects (e.g., through scattering, refraction, reflection, interference, and/or diffraction of visible wavelengths of light) imparted by the set of layers. Stated differently, structural color is color which is produced, at least in part, by microscopically structured layers and/or surfaces that interfere with visible light contacting the layers and/or surfaces. The structural color is color caused by physical phenomena including the scattering, refraction, reflection, interference, and/or diffraction of light, unlike color caused entirely by the absorption or emission of visible light by pigment or dye molecules. For example, optical phenomena which impart structural color can include multilayer interference, thin-film interference, refraction, dispersion, light scattering, Mie scattering, and diffraction, including use of diffraction grating.

In various aspects described herein, color imparted to a substrate by the concealing layer, including a structural color, can be visible to a viewer having 20/20 visual acuity and normal color vision from a distance of about 1 meter from the substrate. The concealing layer may impart an aesthetically appealing color to the substrate, which may include a repurposed material. In aspects where the color of the concealing layer is entirely structurally colored, the concealing layer may impart color without requiring the use of inks or pigments or other types of color additives. In some instances, the structural color may be imparted at a first instant in time (e.g. at the point of sale) providing the initial aesthetically appealing color, and the concealing layer may be removed, for example, by abrading or wearing away during normal wear of the article, such that a color of the substrate (e.g., a repurposed material) is gradually exposed over time, or at a later instant in time to provide an appealing, color-exposing experience. In some aspects, a consumer can initiate or accelerate removal of the concealing layer from the substrate. Removal of the concealing layer can include scratching, scraping, cutting, sanding, burning, or dissolving the concealing layer.

After disposing the concealing layer onto the substrate, the substrate exhibits a different color from the underlying surface of the substrate. In aspects where the concealing layer is structurally colored, the concealed material (e.g., the substrate combined with the structural-color element) exhibits the different color without the application of additional pigments or dyes to the substrate. For example, the color can differ from the color of the underlying surface of the substrate based on a color parameter such as hue, value, chroma, iridescence, or any combination thereof. In particular examples, the color of the concealed material and the color of the underlying surface of the substrate differ both in hue and iridescence, where the color imparted by the concealing layer is iridescent (e.g., exhibits two or more different hues when viewed from at least two different angles 15 degrees apart), and the color of the underlying substrate is not iridescent. The concealing layer can be disposed (e.g., affixed, attached, adhered, bonded, joined) to a surface of one or more components of a footwear article, such as on the shoe upper and/or the sole of an article of footwear.

In an aspect of the disclosure, structural color is produced, at least in part, by one or more layers of a set of layers having thicknesses in the nanometer to hundreds of nanometer range, which are formed of organic or inorganic materials which reflect and/or absorb light as opposed to the color being produced solely by pigments and/or dyes. The coloration of a concealing layer including a structural-color element can be due solely to structural color (i.e., the concealing layer can be substantially free of pigments and/or dyes). Structural color can also be used in combination with pigments and/or dyes, for example, to alter all or a portion of a structural color.

"Hue" is commonly used to describe the property of color which is discernible based on a dominant wavelength of visible light, and is often described using terms such as magenta, red, orange, yellow, green, cyan, blue, indigo, violet, etc. or can be described in relation (e.g., as similar or dissimilar) to one of these. The hue of a color is generally considered to be independent of the intensity or lightness of the color. For example, in the Munsell color system, the properties of color include hue, value (lightness), and chroma (color purity). Particular hues are commonly associated with particular ranges of wavelengths in the visible spectrum: wavelengths in the range of about 700 to 635 nanometers are associated with red, the range of about 635 to 590 nanometers is associated with orange, the range of about 590 to 560 nanometers is associated with yellow, the range of about 560 to 520 nanometers is associated with green, the range of about 520 to 490 nanometers is associated with cyan, the range of about 490 to 450 nanometers is associated with blue, and the range of about 450 to 400 nanometers is associated with violet.

The color (including the hue) of an article (e.g., the substrate, the substrate as obscured by a concealing layer, or the concealed material) as perceived by a viewer can differ from the actual color of the article. The color as perceived by a viewer depends not only on the physics of the article, but also its environment and the characteristics of the perceiving eye and brain. For example, as the color perceived by a viewer is determined by the actual color of the article (e.g., the color of the light leaving the surface of the article), by the viewer's ability to detect the wavelengths of light reflected or emitted by the article, by the wavelengths of light used to illuminate the article, as well as other factors such as the coloration of the environment of the article, and the type of incident light (e.g., sunlight, fluorescent light, and the like). As a result, the color of an object as perceived by a viewer can differ from the actual color of the article.

When used in the context of structural color, one can characterize the hue of a structurally colored article, i.e., an article or concealed material that has been structurally colored by applying a concealing layer with a structural-color element to the substrate, based on the wavelengths of light the structurally colored portion of the article absorbs and reflects (e.g., linearly and non-linearly). While the concealing layer may impart a first structural color, the presence of an optional textured surface and/or primer layer can alter the structural color. Other factors such as coatings or transparent elements may further alter the perceived structural color. The hue of the structural color can include any of the hues described herein as well as any other hues or combination of hues. The structural color can be referred to as a "single hue" (i.e., the hue remains substantially the same, regardless of the angle of observation and/or illumination), or "multihued" (i.e., the hue varies depending upon the angle of observation and/or illumination). The multihued structural color can be iridescent (i.e., the hue changes gradually over two or more hues as the angle of observation or illumination changes). In some instances, the hue of an iridescent multihued structural color can change gradually across all the hues in the visible spectrum (e.g., like a "rainbow") as the angle of observation or illumination changes. In other instances, the hue of a multihued structural color can change gradually across a limited number of hues in the visible spectrum (e.g., partial hue range) as the angle of observation or illumination changes, in other words, one or more hues in the visible spectrum (e.g., red, orange, yellow, etc.) are not observed in the structural color as the angle of observation or illumination changes. Further still, the hue of a multihued structural color can change more abruptly between a limited number of hues (e.g., between 2-8 hues, or between 2-4 hues, or between 2 hues) as the angle of observation or illumination changes. Alternatively, only one hue, or substantially one hue, in the visible spectrum may be present for a single-hued structural color.

As such, the structural color can be a multi-hued structural color in which two or more hues are imparted by the structural color. The structural color can be iridescent multi-hued structural color in which the hue of the structural color varies over a wide number of hues (e.g., 4, 5, 6, 7, 8 or more hues) when viewed at a single viewing angle, or when viewed from two or more different viewing angles that are at least 15 degrees apart from each other. Alternatively, the structural color can be a partial-hue-range structural color in which the hue of the structural color varies, or varies substantially (e.g., about 90 percent, about 95 percent, or about 99 percent) over a limited number of hues (e.g., 2 hues, or 3 hues) when viewed from two or more different viewing angles that are at least 15 degrees apart from each other. In some aspects, a structural color having partial-hue-range properties is limited to two, three or four hues selected from the RYB primary colors of red, yellow and blue, optionally the RYB primary and secondary colors of red, yellow, blue, green, orange and purple, or optionally the RYB primary, secondary and tertiary colors of red, yellow, blue, green, orange purple, green-yellow, yellow-orange, orange-red, red-purple, purple-blue, and blue-green.

The structural color can be single-hue angle-independent structural color in which the hue, the hue and value, or the hue, value and chroma of the structural color is independent of or substantially (e.g., about 90 percent, about 95 percent, or about 99 percent) independent of the angle of observation. For example, the single-hue angle-independent structural color can display the same hue or substantially the same hue when viewed from at least 3 different angles that are at least 15 degrees apart from each other (e.g., single-hue structural color).

The structural color imparted can be a structural color having partial-hue-range properties such that, when each color observed at each possible angle of observation is assigned to a single hue selected from the group consisting of the primary, secondary and tertiary colors on the red yellow blue (RYB) color wheel, for a single structural color, all of the assigned hues fall into a single hue group, wherein the single hue group is one of a) green-yellow, yellow, and yellow-orange; b) yellow, yellow-orange and orange; c) yellow-orange, orange, and orange-red; d) orange-red, and red-purple; e) red, red-purple, and purple; f) red-purple, purple, and purple-blue; g) purple, purple-blue, and blue; h) purple-blue, blue, and blue-green; i) blue, blue-green and green; and j) blue-green, green, and green-yellow. In other words, in this example of partial-hue range, the hue (or the hue and the value, or the hue, value and chroma) imparted by the structural color varies depending upon the angle at which the structural color is observed, but the hues of each of the different colors viewed at the various angles of observations varies over a limited number of possible hues. The hue visible at each angle of observation can be assigned to a single primary, secondary or tertiary hue on the red yellow blue (RYB) color wheel (i.e., the group of hues consisting of red, yellow, blue, green, orange purple, green-yellow, yellow-orange, orange-red, red-purple, purple-blue, and blue-green). For example, while a plurality of different colors are observed as the angle of observation is shifted, when each observed hue is classified as one of red, yellow, blue, green, orange purple, green-yellow, yellow-orange, orange-red, red-purple, purple-blue, and blue-green, the list of assigned hues includes no more than one, two, or three hues selected from the list of RYB primary, secondary and tertiary hues. In some examples of partial-hue range structural color, all of the assigned hues fall into a single hue group selected from hue groups a)-j), each of which include three adjacent hues on the RYB primary, secondary and tertiary color wheel. For example, all of the assigned hues can be a single hue within hue group h) (e.g., blue), or some of the assigned hues can represent two hues in hue group h) (e.g., purple-blue and blue), or can represent three hues in hue group h) (e.g., purple-blue, blue, and blue-green).

Similarly, other properties of the color, including a structural color, such as the lightness of the color, the saturation of the color, and the purity of the color, among others, can be substantially the same regardless of the angle of observation or illumination, or can vary depending upon the angle of observation or illumination. The color can have a matte appearance, a glossy appearance, or a metallic appearance, or a combination thereof.

As discussed above, the color (including hue) of an article or substrate, including a structurally colored article or concealed material, can vary depending upon the angle at which the article or substrate is observed or illuminated. The hue or hues of an article or substrate can be determined by observing the article or substrate, or illuminating the article or substrate, at a variety of angles using constant lighting conditions. As used herein, the "angle" of observation, illumination, or viewing is the angle measured from an axis or plane that is orthogonal to the surface. The observing, illuminating, or viewing angles can be set between about 0 and 180 degrees. The observing, illuminating, or viewing angles can be set at 0 degrees, 15 degrees, 30 degrees, 45 degrees, 60 degrees, and −15 degrees and the color can be measured using a colorimeter or spectrophotometer (e.g., Konica or Minolta), which focuses on a particular area of the article or substrate to measure the color. The observing, illuminating, or viewing angles can be set at 0 degrees, 15 degrees, 30 degrees, 45 degrees, 60 degrees, 75 degrees, 90 degrees, 105 degrees, 120 degrees, 135 degrees, 150 degrees, 165 degrees, 180 degrees, 195 degrees, 210 degrees, 225 degrees, 240 degrees, 255 degrees, 270 degrees, 285 degrees, 300 degrees, 315 degrees, 330 degrees, and 345 degrees and the color, including a structural color can be measured using a colorimeter or spectrophotometer. In a particular example of a multihued article or substrate colored using only structural color, when measured at 0 degrees, 15 degrees, 30 degrees, 45 degrees, 60 degrees, and −15 degrees, the hues measured for article consisted of "blue" at three of the measurement angles, "blue-green" at 2 of the measurement angles and "purple" at one of the measurement angles.

In other embodiments, the color (including hue, value and/or chroma) of an article or substrate, including a structurally-colored article or concealed material, does not change substantially, if at all, depending upon the angle at which the article is observed, illuminated, or viewed. In instances such as this, the color can be an angle-independent structural color in that the hue, the hue and value, or the hue, value and chroma observed is substantially independent or is independent of the angle of observation, illumination, or viewing.

Various methodologies for defining color coordinate systems exist. One example is L*a*b* color space, where, for a given illumination condition, L* is a value for lightness, and a* and b* are values for color-opponent dimensions based on the CIE coordinates (CIE 1976 color space or CIELAB). In some aspects, a colored article or substrate, including a structurally colored article or concealed material, can be considered as having a "single" color when the change in color measured for the article is within about 10% or within about 5% of the total scale of the a* or b* coordinate of the L*a*b* scale (CIE 1976 color space) at three or more measured observation, illumination, or viewing angles selected from measured at observation, illumination, or viewing angles of 0 degrees, 15 degrees, 30 degrees, 45 degrees, 60 degrees, and −15 degrees. In certain embodiments, colors which, when measured and assigned values in the L*a*b* system that differ by at least 5 percent of the scale of the a* and b* coordinates, or by at least 10 percent of the scale of the a* and b* coordinates, are considered to be different colors. The structurally colored article can have a change of less than about 40%, or less than about 30%, or less than about 20%, or less than about 10%, of the total scale of the a* coordinate or b* coordinate of the L*a*b* scale (CIE 1976 color space) at three or more measured observation, illumination, or viewing angles.

A change in color between two measurements in the CIELAB space can be determined mathematically. For example, a first measurement has coordinates L1*, a1* and b1*, and a second measurement has coordinates L2*, a2* and b2*. The total difference between these two measurements on the CIELAB scale can be expressed as $\Delta E^*ab$ which is calculated as follows: $\Delta E^*ab=[(L1^*-L2^*)2+(a1^*-a2^*)2+(b1^*-b2^*)2]1/2$. Generally speaking, if two colors have a $\Delta E^*ab$ of less than or equal to 1, the difference in color is not perceptible to human eyes, and if two colors have a $\Delta E^*ab$ of greater than 100 the colors are considered to be opposite colors, while a $\Delta E^*ab$ of about 2-3 is considered the threshold for perceivable color difference. In certain aspects, an article or material can be considered as having a "single" color when the $\Delta E^*ab$ is less than 60, or less than 50, or less than 40, or less than 30, between three or more measured observation, illumination, or viewing angles selected from measured at observation, illumination, or viewing angles of 0 degrees, 15 degrees, 30 degrees, 45 degrees, 60 degrees, and −15 degrees. The article or material can have a $\Delta E^*ab$ that is less than about 100, or less than about 80, or less than about 60, between two or more measured observation, illumination, or viewing angles.

In accordance with these aspects, when a first color of a substrate or concealing layer and a second color of a different substrate or concealing layer have a $\Delta E^*ab$ of less than or equal to 2 as measured from a same observation, illumination, or viewing angle, the first color and the second color are "visually similar" to one another. In related aspects, when a first color of a substrate or concealing layer and a second color of a different substrate or different concealing layer have a $\Delta E^*ab$ of greater than or than or equal to 2 as measured from a same observation, illumination, or viewing angle, the first color and the second color are "visually different" from one another.

Continuing with these aspects, when a first structural color produced by a concealed material or concealing layer with a structural-color element and a structural second color produced by a different concealed material or different concealing layer with a structural-color element have a $\Delta E^*ab$ of less than or equal to 2 as measured from a same observation, illumination, or viewing angle, the first structural color and the second structural color are "visually similarly" to one another. In similar aspects, when a first structural color produced by a concealed material or concealing layer with a structural-color element and a structural second color produced by a different concealed material or different concealing layer with a structural-color element have a $\Delta E^*ab$ of greater than or than or equal to 2 as measured from a same observation, illumination, or viewing angle, the first structural color and the second structural color are "visually different" from one another.

Another example of a color scale is the CIELCH color space, where, for a given illumination condition, L* is a value for lightness, C* is a value for chroma, and h° denotes a hue as an angular measurement. In an embodiment, a colored article or concealed material can be considered as having a "single" color when the color measured for the article or material is less than 10 degrees different or less than 5 degrees different at the h° angular coordinate of the CIELCH color space, at three or more measured observation, illumination, or viewing angles selected from measured observation, illumination, or viewing angles of 0 degrees, 15 degrees, 30 degrees, 45 degrees, 60 degrees, and −15 degrees. In certain aspects, colors which, when measured and assigned values in the CIELCH system that vary by at least 45 degrees in the h° measurements, are considered to be different colors. The colored article or material can have a change of less than about 60 degrees, or less than about 50 degrees, or less than about 40 degrees, or less than about 30 degrees, or less than about 20 degrees, or less than about 10 degrees, in the h° measurements of the CIELCH system at three or more measured observation, illumination, or viewing angles.

Another system for characterizing color includes the "PANTONE" Matching System (Pantone LLC, Carlstadt, N.J., USA), which provides a visual color standard system to provide an accurate method for selecting, specifying, broadcasting, and matching colors through any medium. In an example, a colored article or material can be considered as having a "single" color when the color measured for the article is within a certain number of adjacent standards, e.g., within 20 adjacent PANTONE standards, at three or more measured observation, illumination, or viewing angles selected from 0 degrees, 15 degrees, 30 degrees, 45 degrees, 60 degrees, and −15 degrees.

Now having described color, additional details regarding the concealing layer are provided. As described herein, the article or substrate (e.g., repurposed material) may include the concealing layer. The concealing layer can include a set of layers including at least one layer having a thickness in the nanometer to hundreds of nanometers range. The concealing layer can include a single or multilayer reflector or a multilayer filter, such as a quarter-wavelength reflector or a quarter-wavelength filter. The concealing layer can function to modify the light that impinges thereupon so that structural color is imparted to the article or substrate. The concealing layer can include a set of layers including at least one optical layer and optionally one or more additional layers (e.g., a protective layer, a textured layer, a primer layer, a polymer layer, and the like).

The method of making the concealing layer can include disposing (e.g., affixing, attaching, bonding, fastening, joining, appending, connecting, binding, and operably disposed, etc.) the concealing layer onto an article or substrate (e.g., an article of footwear, an article of apparel, an article of sporting equipment, a repurposed material used to construct a footwear article, etc.). The article or substrate has a surface upon which the concealing layer can be disposed. The surface of the article or substrate can be made of a polymeric composition such as a thermoplastic material or thermoset material, as described herein. For example, the article or substrate has a surface including a thermoplastic material, for example an externally facing surface of the article or material. The concealing layer can be disposed onto a thermoplastic material or a thermoset material, for example. The article or substrate may include a variety of different textiles, including but not limited to, leather, synthetic leather, knit, woven, non-woven, braided, etc.

The method of making the colored article or concealed material (e.g., repurposed material obscured with a concealing layer including a structurally colored element) can include disposing (e.g., affixing, attaching, bonding, fastening, joining, appending, connecting, binding) the concealing layer onto an article or material (e.g., an article of footwear, an article of apparel, an article of sporting equipment, etc.). The article has a surface upon which the concealing layer can be disposed.

In aspects, the concealing layer that includes a structural color-element may also include a set of layers and/or a set of properties, which may reflect an overall property of the structural color element, a property of the set of layers, or a property of one or more layers of the set of layers. In accordance with these aspects, the set of layers may include a quantity of layers, an arrangement of layers, a thickness, a chemical composition of a layer, or any combination thereof. Aspects herein contemplate that the chemical composition of a layer may include one or more metals, one or more metal oxides, one or more polymers, or a combination thereof. In other aspects, the one or more sets of layers may include an outermost layer that comprises an outermost layer nano-topography.

The set of layers of a concealing layer including a structural color element may include one or more optical layers and can be formed using known techniques such as physical vapor deposition, electron beam deposition, atomic layer deposition, molecular beam epitaxy, cathodic arc deposition, pulsed laser deposition, sputtering deposition (e.g., radio frequency, direct current, reactive, non-reactive), chemical vapor deposition, plasma-enhanced chemical vapor deposition, low pressure chemical vapor deposition and wet chemistry techniques such as layer-by-layer deposition, sol-gel deposition, Langmuir blodgett, and the like. The optical layer(s) of the set of layers of the concealing layer may comprise a multilayer reflector. The multilayer reflector can be configured to have a certain reflectivity at a given wavelength of light (or range of wavelengths) depending, at least in part, on the chemical composition selection, thickness, and quantity of the layers of the multilayer reflector. In other words, one can carefully select the chemical composition, thicknesses, and quantity of the layers of a multilayer reflector and optionally its interaction with one or more other layers, so that it can reflect a certain wavelength of light (or range of wavelengths), to produce a desired structural color. The optical layer can include at least two adjacent layers, where the adjacent layers have different refractive indices. The difference in the index of refraction of adjacent layers can be about 0.0001 to 50 percent, about 0.1 to 40 percent, about 0.1 to 30 percent, about 0.1 to 20 percent, about 0.1 to 10 percent (and other ranges there between (e.g., the ranges can be in increments of 0.0001 to 5 percent)). The index of refraction depends at least in part upon the chemical composition of one or more layers and can range from 1.3 to 2.6.

The set of layers of the concealing layer including a structural-color element can include 2 to 20 optical layers, 2 to 10 optical layers, 2 to 6 optical layers, or 2 to 4 optical layers. Each layer of the concealing layer can have a thickness that is about one-fourth of the wavelength of light to be reflected to produce the desired structural color (i.e., the concealing layer can include a quarter-wavelength reflector). Each layer of the concealing layer can have a thickness of about 10 to 500 nanometers or about 90 to 200 nanometers. The set of layers of the concealing layer can include at least two layers, where adjacent layers have different thicknesses and different refractive indices. Alternatively, adjacent layers can have the same thicknesses and different refractive indices.

The concealing layer including a structural-color element can comprise a multilayer filter. The multilayer filter destructively interferes with light that impinges upon the structure or article, where the destructive interference of the light and optionally interaction with one or more other layers or structures (e.g., a multilayer reflector, a textured structure) impart the structural color. In this regard, the layers of the multilayer filter can be designed (e.g., material or chemical composition selection, thickness, number of layers, and the like) so that a single wavelength of light, or a particular range of wavelengths of light, make up the structural color. For example, the range of wavelengths of light can be limited to a range within plus or minus 30 percent or a single wavelength, or within plus or minus 20 percent of a single wavelength, or within plus or minus 10 percent of a single wavelength, or within plus or minus 5 percent of a single wavelength. The optical layer(s) can include multiple layers where each layer independently comprises a material or chemical composition selected from: the transition metals, the metalloids, the lanthanides, and the actinides, and mixtures or alloys thereof, as well as nitrides, oxynitrides, sulfides, sulfates, selenides, and tellurides of any of these. The material or chemical composition can be selected to provide an index of refraction that, when optionally combined with the other layers of the structural-color element, achieves the desired result. One or more layers of the optical layer can be made of liquid crystals. Each layer of the optical layer can be made of liquid crystals. One or more layers of the optical layer can be made of a material such as: silicon, silicon dioxide, titanium, titanium dioxide, zinc, zinc sulfide, magnesium, magnesium fluoride, tantalum, tantalum pentoxide, aluminum, aluminum oxide, or a combination thereof. Each layer of the optical layer can be made of a material such as: silicon dioxide, titanium dioxide, zinc sulfide, magnesium fluoride, tantalum pentoxide, aluminum oxide, or a combination thereof.

The concealing layer including a structural-color element can be substantially free of pigments or dyes (e.g., contain less than 0.001 weight percent of pigments or dyes added to its layers), pigmented or dyed (e.g., pigments and/or dyes are added to its layers (e.g., dark or black color)), reflective (e.g., having a percent reflectance of at least 50 percent, or at least 60 percent or at least 70 percent, or at least 80 percent), and/or transparent (e.g., percent transmittance of 75 percent or more). The surface of the article or substrate upon which the concealing layer is disposed can be substantially free of pigments or dyes (i.e., less than 0.001 weight percent of pigments or dyes added to the material), pigmented or dyed (e.g., pigments and/or dyes are added to the material (e.g., dark or black color)), reflective (e.g., having a percent reflectance of at least 50 percent, or at least 60 percent or at least 70 percent, or at least 80 percent), and/or transparent (e.g., percent transmittance of 75 percent or more).

The optical layer(s) of the set of layers of the concealing layer including a structural-color element or the surface of the article or substrate can be formed in a layer-by-layer manner, where each layer has a different index of refraction. Each optical layer can be formed using known techniques such as physical vapor deposition including: chemical vapor deposition, pulsed laser deposition, evaporative deposition, sputtering deposition (e.g., radio frequency, direct current, reactive, non-reactive), plasma enhanced chemical vapor deposition, electron beam deposition, atomic layer deposition, molecular beam epitaxy, cathodic arc deposition, low pressure chemical vapor deposition and wet chemistry techniques such as layer by layer deposition, sol-gel deposition, Langmuir blodgett and the like.

FIGS. 5A-5D respectively illustrate a perspective view, an exploded view, a top view, and a sectional view of example substrates and example concealing layers that include a structural-color element, in accordance with an aspect hereof. In these examples, each concealing layer is referred to as a structural-color element, and as shown, a third concealed material 131, a fourth concealed material 141, and a fifth concealed material 151 are depicted. The third concealed material 131 includes a third substrate 130 and a first structural-color element 230; the fourth concealed material 141 includes a fourth substrate 140 and a second structural-color element 240; and the fifth concealed material 151 includes the fourth substrate 140 and the first structural-color element 230. In FIGS. 5A-5D, the third, fourth, and fifth concealed materials 131, 141, 151, the third and fourth substrates 130, 140, and the first and second structural-color elements 230, 240 are depicted in a simplified fashion for discussion purposes, and it is understood that these depictions are illustrative in nature and are not limiting. Thus, aspects herein contemplate that the third and fourth substrates 130, 140 and the first and second structural-color elements 230, 240 may be reshaped, duplicated, reconfigured, or have an irregular shape that forms a portion of a footwear article.

In one example aspect, the third substrate 130, the fourth substrate 140, or both are a repurposed material. As such, the third substrate 130 is a first repurposed material, and the fourth substrate 140 is a second repurposed material that is different than the first repurposed material. In turn, one or more characteristics of the first repurposed material are different than one or more corresponding characteristics of the second repurposed material. In aspects, it is contemplated that the first repurposed material and the second repurposed material may be a same material. In further aspects, it is contemplated that the third substrate 130, the fourth substrate 140, or both exclude a repurposed material.

Focusing now on the third concealed material 131, the third substrate 130 is planar, has minimal thickness, and includes a third externally facing surface 132, a third internally facing surface 134, and a fifth color 412 that is represented by a single hatching including vertical lines. The third externally facing surface 132 is flat, has a smooth texture, presents the fifth color 412, and opposes the third internally facing surface 134, which is also flat and of a smooth texture. While not illustratively depicted in FIGS. 5A-5D, like the first and second substrates discussed above, the third substrate 130 has a third characteristic including at least one of a third composition, a third basis weight, a third thickness, a third construction, and a third surface topography. As such, third composition of the third substrate 130 may be a textile material that includes one or more natural leathers, synthetic leathers, molded polymeric components, polymer foams, and the like. Further, in example aspects, the third composition of the third substrate 130 may include a material that is cut from a larger piece of material having two opposing surfaces and minimal thickness (e.g., an overstock material roll) that was previously designated to be disposed. In other aspects, the third construction of the third substrate 130 may include a formed-to-shape material, such as a knit, woven, braided, non-woven material that is formed in a generic shape or in a specific shape, such as a shape included as part of pattern in an upper portion of a footwear article.

The first structural-color element 230 is a third concealing layer that is flat, has a thickness, and includes a third outwardly facing surface 232, a third inwardly facing surface 234, and a first set of layers including a first plurality of constituent layers 235, a first reflective layer 236, and a second plurality of constituent layers 237. The first set of layers overlays the third substrate 130 such that the third inwardly facing surface 234 is adjacent to and in contact with the third externally facing surface 132 of the third substrate 130. In example aspects, the first structural-color element 230 is disposed (e.g., affixed, attached, adhered, bonded, joined) on the third externally facing surface 132 and is configured to obscure or alter the fifth color 412 of the third substrate 130.

The first plurality of constituent layers 235 includes three individual layers; one that is disposed on the third externally facing surface 132 and forms the third inwardly facing surface 234, one that is adjacent to the first reflective layer 236, and one positioned in there-between. The second plurality of constituent layers 237 also includes three individual layers that are positioned opposite the first plurality of constituent layers 235 in the first plurality of layers. The first reflective layer 236 is positioned between the first and second sets of constituent layers 235, 237. In accordance with aspects herein, the first and second pluralities of constituent layers 235, 237 and/or the first reflective layer 236 may include an optical layer with any combination of aspects related to any optical layers discussed in this disclosure. Moreover, one or more properties of the first set of layers and/or one or more optical layers thereof, such as a quantity of layers, a thickness of each of the layers, a chemical composition of each layer, a refractive index of each layer, and the like can result in an optical effect which produces a first structural color 450. As such, in the example of FIGS. 5A-5D, the first structural-color element 230 is configured to produce the first structural color 450 when applied to the third substrate 130. The first structural color 450 is represented by a cross hatching of two lines, one of which has a positive slope and another that has a negative slope.

Turning now to the fourth concealed material 141, the fourth substrate 140, like the third substrate 130, is planar, has minimal thickness, and includes a fourth externally facing surface 142, a fourth internally facing surface 144, and a sixth color 422 that is represented by a single hatching including lines with a positive slope. The fourth externally facing surface 142 is flat, has a smooth texture, presents the sixth color 422, and opposes the fourth internally facing surface 144, which is also flat and of a smooth texture. While not illustratively depicted in FIGS. 5A-5D, like the first, second, third substrates discussed above, the fourth substrate 140 has a fourth characteristic including at least one of a fourth composition, a fourth basis weight, a fourth thickness, a fourth construction, and a fourth surface topography. As such, the fourth composition of the fourth substrate 140 may be a textile material that includes one or more natural leathers, synthetic leathers, molded polymeric components, polymer foams, and the like. Further, in example aspects, the fourth composition of the fourth substrate 140 may include a material that is cut from a larger piece of material having two opposing surfaces and minimal thickness (e.g., an overstock material roll) that was previously designated to be disposed. In other aspects, the fourth construction of the fourth substrate 140 may include a formed-to-shape material, such as a knit, woven, braided, non-woven material that is formed in a generic shape or in a specific shape, such as a shape included as part of pattern in an upper portion of a footwear article.

The second structural-color element 240 is a fourth concealing layer that is flat, has a thickness, and includes a fourth outwardly facing surface 242, a fourth inwardly facing surface 244, and a second set of layers including a third plurality of constituent layers 245, a second reflective layer 246, and a fourth plurality constituent layers 247. The second set of layers overlays the fourth substrate 140 such that the fourth inwardly facing surface 244 is adjacent to and in contact with the fourth externally facing surface 142 of the fourth substrate 140. In example aspects, the second structural-color element 240 is disposed (e.g., affixed, attached, adhered, bonded, joined) on the fourth externally facing surface 142 and is configured to obscure or alter the sixth color 422 of the fourth substrate 140.

The third plurality of constituent layers 245 includes two individual layers; one that is disposed on the fourth externally facing surface 142 and forms the fourth inwardly facing surface 244, and another that is adjacent to the second reflective layer 246. The fourth plurality of constituent layers 247 also includes two individual layers that are positioned opposite the third plurality of constituent layers 245 in the second set of layers. The second reflective layer 246 is positioned between the third and fourth pluralities of constituent layers 245, 247. In accordance with aspects herein, the third and fourth pluralities of constituent layers 245, 247 and/or the second reflective layer 246 may include an optical layer with any combination of aspects related to an optical layers discussed in this disclosure. Moreover, one or more properties of the second set of layers and/or one or more optical layers thereof, such as a quantity of layers, a thickness of each of the layers, a chemical composition of each layer, a refractive index of each layer, and the like, can result in an optical effect which produces a second structural color 460. Accordingly, in the example of FIGS. 5A-5D, the second structural-color element 240 is configured to produce the second structural color 460 when applied to the fourth substrate 140. The second structural color 460 is represented by a cross hatching of two lines, one of which has a positive slope and another that has a negative slope.

Continuing, the fifth concealed material 151 includes the fourth substrate 140 and the first structural-color element 230. As shown in FIGS. 5A-5D, the fourth substrate 140 has the same features in the fifth concealed material 151 as it has in the fourth concealed material 141, and likewise, the first structural-color element 230 has the same features in the fifth concealed material 151 as it has in the third concealed material 131. However, when the first structural-color element 230 is applied to the fourth substrate 140, which has one or more different characteristics than the third substrate 130, the first structural-color element 230 is configured to produce a third structural color 470, which is represented by a cross hatching of two perpendicular lines, one of which extends vertically and another that extends horizontally.

In additional example aspects, the third characteristic of the third substrate 110 is different than the corresponding fourth characteristic of the fourth substrate 140. In one example, the third characteristic of the third substrate 130 includes the third construction, and the fourth characteristic of the fourth substrate 140 includes the fourth construction, which is different than the third construction. In other examples, the third characteristic of the third substrate 130 includes the third composition, and the fourth characteristic of the fourth substrate 140 includes the fourth composition, which is different than the third composition. In another example, the third characteristic of the third substrate 130 includes the third basis weight, and the fourth characteristic of the fourth substrate 140 includes the fourth basis weight, which is different than the third basis weight. In yet another example, the third characteristic of the third substrate 130 includes the third thickness, and the fourth characteristic of the fourth substrate 140 includes the fourth thickness, which is different than the third thickness. In yet another example still, the third characteristic of the third substrate 130 includes the third surface topography, and the fourth characteristic of the fourth substrate 140 includes the fourth surface topography, which is different than the third surface topography. Additional examples contemplated herein are provided later.

Figure 6:
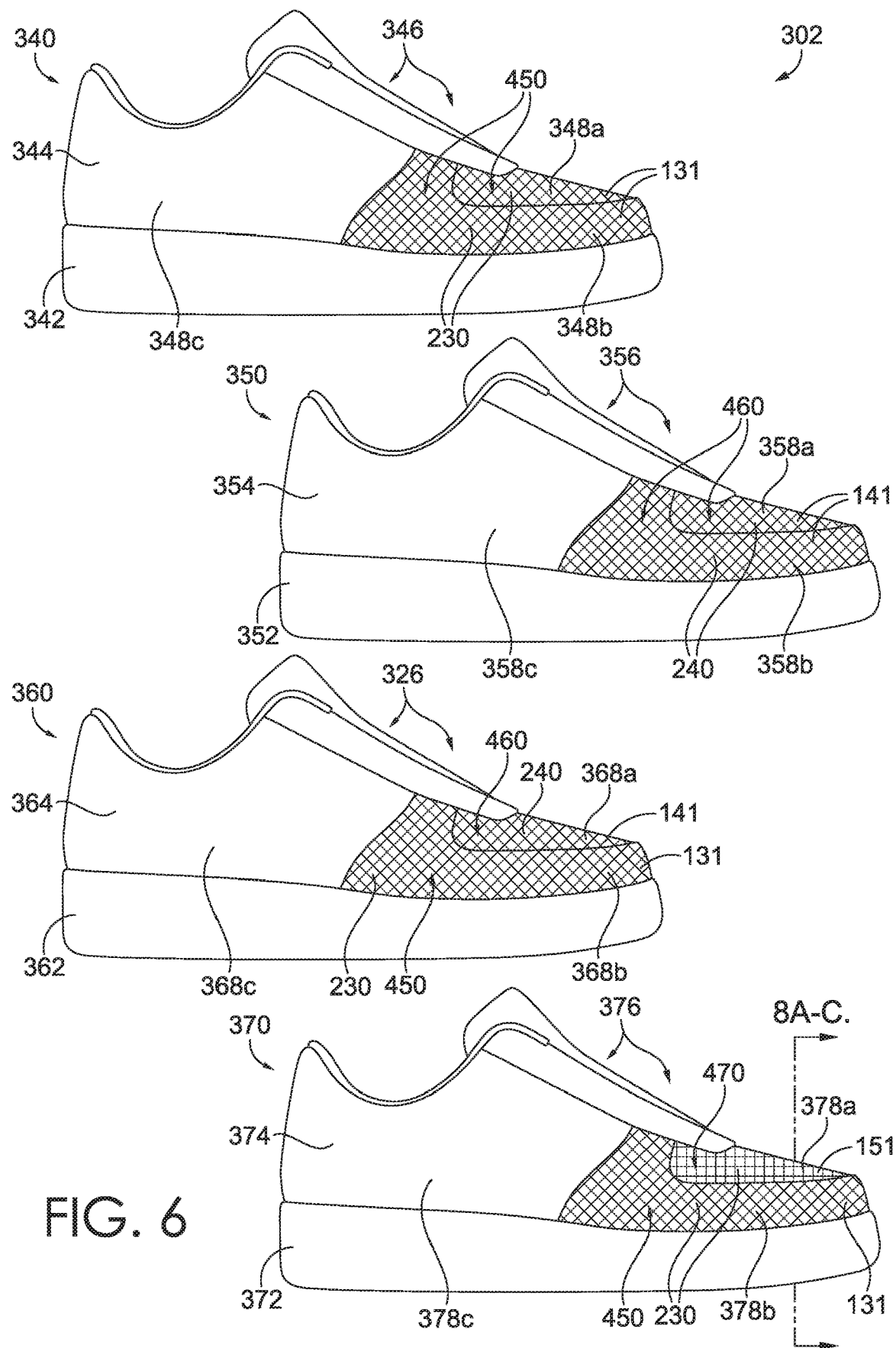
FIG. 6 illustrates a side view of an example second array of colored footwear articles, in accordance with an aspect hereof.
Figure 7:
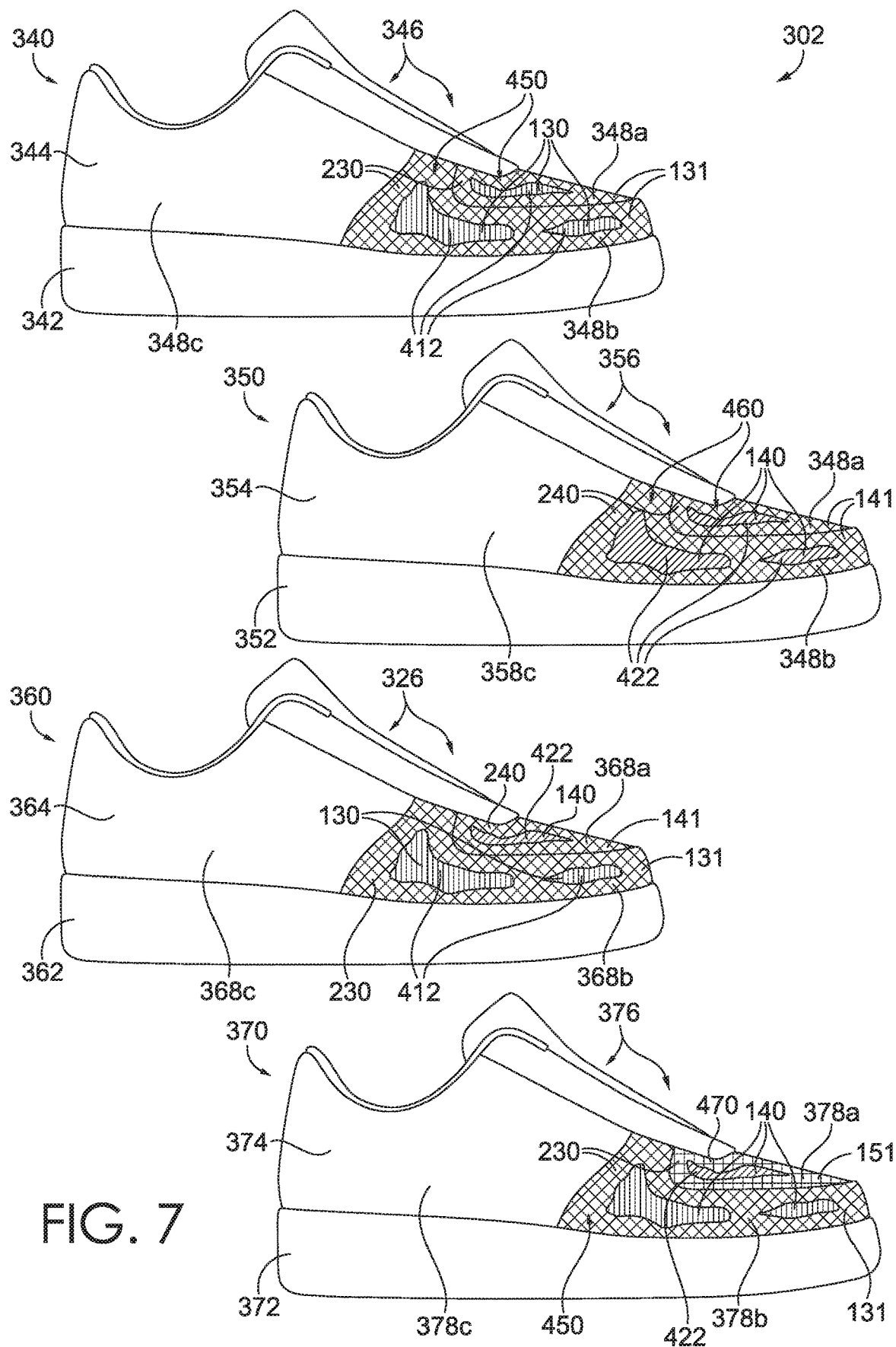
FIG. 7 illustrates a side view of the second array of colored footwear articles of FIG. 6 and depicts a concealing layer of each footwear article as partially abraded, in accordance with an aspect hereof.

Referring now to FIGS. 6 and 7, FIG. 6 illustrates a lateral side of each footwear article of an example second array of colored footwear articles 302. As shown, the second array of colored footwear articles 302 includes a fourth footwear article 340, a fifth footwear article 350, a sixth footwear article 360, and a seventh footwear article 370. In FIG. 6, each footwear article 340, 350, 360, 370 includes one or more concealed materials, and in FIG. 7, each footwear article 340, 350, 360, 370 is depicted with one or more concealed materials at least partially abraded.

In accordance with an aspect of the present disclosure, the structural-color elements abrade at a rate within a measured range. For example, the structural-color layer may retain its structure and/or structural color for at least a minimum number of crockmeter cycles. In aspects of the present disclosure, the minimum number is at least 10 cycles. In other aspects of the present disclosure, the minimum number is at least 50 cycles, and in yet other aspects, the minimum number is at least 100 cycles. In another aspect, the structural-color element layer may retain its structure and/or structural color for a minimum number of cycles, and at least partially abrade to present the color of the substrate when subjected to a maximum number of cycles. For example, the structural-color element may retain its structure and/or structural color for at least 10 cycles, and at least partially abrade to reveal the color of the substrate when subjected to fewer than 100 cycles. Alternatively, the structural-color element may retain its structure and/or structural color for at least 50 cycles, and at least partially abrade to reveal the color of the substrate when subjected to fewer than 200 cycles. In yet another aspect, the structural-color element may retain its structure and/or structural color for at least 100 cycles, and at least partially abrade to present the color of the substrate when subjected to fewer than 400 cycles. In a further aspect, the crockmeter cycles may be administered pursuant to ASTM D5053-03(2015), which in this disclosure includes a method for determining abradability. Alternatively, the crockmeter cycles may be administered pursuant to a test similar to ASTM D5053-03(2015).

Each of the fourth, fifth, sixth, and seventh footwear articles 340, 350, 360, 370 include similar elements, which are also similar to the elements of the first, second, and third footwear articles 310, 320, 330. Notwithstanding, the fourth, fifth, sixth, and seventh footwear articles 340, 350, 360, 370 differ from one another and also from each of the first, second, and third footwear articles 310, 320, 330 in regards to what substrates, concealing layers, and combinations thereof are included in their respective uppers. As such, unless stated otherwise, corresponding reference numbers refer to like components (e.g., 314, 324, 334, 344, 354, 364, 374 each identify an upper of a respective footwear article), and descriptions of any shared aspects that have already been discussed herein, will not be repeated.

The fourth footwear article 340 includes a fourth sole structure 342, a fourth upper 344, and a fourth pattern of panels 346 including a fourth toe portion 348A, a fourth forefoot portion 348B, and a fourth heel portion 348C, and the fifth footwear article 350 includes a fifth sole structure 352, a fifth upper 354, and a fifth pattern of panels 356 including a fifth toe portion 358A, a fifth forefoot portion 358B, and a fifth heel portion 358C. Continuing, the sixth footwear article 360 includes a sixth sole structure 362, a sixth upper 364, and a sixth pattern of panels 366 including a sixth toe portion 368A, a sixth forefoot portion 368B, and a sixth heel portion 368C, and likewise, the seventh footwear article 370 includes a seventh sole structure 372, a seventh upper 374, and a seventh pattern of panels 376 including a seventh toe portion 378A, a seventh forefoot portion 378B, and a seventh heel portion 378C.

Focusing on the fourth footwear article 340, the fourth toe portion 348A and the fourth forefoot portion 348B are constructed from the third concealed material 131 (identified in FIG. 6), and the features of the third concealed material 131 (discussed above in connection with FIGS. 5A-5B) are included at these portions of the fourth upper 344. Thus, at the fourth toe portion 348A and the fourth forefoot portion 348B, the fourth upper 344 includes the third substrate 130 (identified in FIG. 7 and obscured from view in FIG. 6) and the first structural-color element 230 (identified in FIG. 6 and abraded in FIG. 7). In FIG. 6, the fifth color 412 of the third substrate 130 is obscured from view, and the first structural color 450 produced by the first structural-color element 230 is presented at the fourth toe portion 348A and the fourth forefoot portion 348B. In FIG. 7, the first structural-color element 230 has partially abraded such that the fifth color 412 of the third substrate 130 is presented.

Turning to the fifth footwear article 350, the fifth toe portion 358A and the fifth forefoot portion 358B are constructed from the fourth concealed material 141 (identified in FIG. 6), and the features of the fourth concealed material 141 (discussed above in connection with FIGS. 5A-5B) are included at these portions of the fifth upper 354. Thus, at the fifth toe portion 358A and the fifth forefoot portion 358B, the fifth upper 354 includes the fourth substrate 140 (identified in FIG. 7 and obscured from view in FIG. 6) and the second structural-color element 240 (identified in FIG. 6 and abraded in FIG. 7). In FIG. 6, the sixth color 422 of the fourth substrate 140 is obscured from view, and the second structural color 460 produced by the second structural-color element 240 is presented at the fifth toe portion 358A and the fifth forefoot portion 358B. In FIG. 7, the second structural-color element 240 has partially abraded such that the sixth color 422 of the fourth substrate 140 is presented.

Moving on to the sixth footwear article 360, the sixth toe portion 368A is constructed from the fourth concealed material 141 (identified in FIG. 6), and the sixth forefoot portion 366B is constructed from the third concealed material 131 (identified in FIG. 6). As such, the features of the fourth concealed material 141 and the third concealed material 131 (discussed above in connection with FIGS. 5A-5B) are respectively included at the sixth toe portion 368a and the sixth forefoot portion 366B of the sixth upper 364.

Thus, at the sixth toe portion 368A, the sixth upper 364 includes the fourth substrate 140 (identified in FIG. 7 and obscured from view in FIG. 6) and the second structural-color element 240 (identified in FIG. 6 and abraded in FIG. 7), and at the sixth forefoot portion 368B, the sixth upper 364 includes the third substrate 130 (identified in FIG. 7 and obscured from view in FIG. 6) and the first structural-color element 230 (identified in FIG. 6 and abraded in FIG. 7). In FIG. 6, the fifth color 412 of the third substrate 130 and the sixth color 422 of the fourth substrate 140 are obscured from view, the second structural color 460 produced by the second structural-color element 240 is presented at the sixth toe portion 368A, and the first structural color 450 produced by the first structural-color element 230 is presented at the sixth forefoot portion 368B. In FIG. 7, the first and second structural-color elements 230, 240 have partially abraded such that the fifth color 412 of the third substrate 130 and the sixth color 422 of the fourth substrate 140 are presented.

Onto the seventh footwear article 370, the seventh toe portion 378A is constructed from the fifth concealed material 151 (identified in FIG. 6), and the seventh forefoot portion 376B is constructed from the third concealed material 131 (identified in FIG. 6). As such, the features of the fifth concealed material 151 and the third concealed material 131 (discussed above in connection with FIGS. 5A-5B) are respectively included at the seventh toe portion 378A and the seventh forefoot portion 378B of the seventh upper 374.

Thus, at the seventh toe portion 378A, the seventh upper 374 includes the fourth substrate 140 (identified in FIG. 7 and obscured from view in FIG. 6) and the first structural-color element 230 (identified in FIG. 6 and abraded in FIG. 7), and at the seventh forefoot portion 378B, the seventh upper 374 includes the third substrate 130 (identified in FIG. 7 and obscured from view in FIG. 6) and the first structural-color element 230 (identified in FIG. 6 and abraded in FIG. 7). In FIG. 6, the sixth color 422 of the fourth substrate 140 is obscured from view, the third structural color 470 is presented at the seventh toe portion 378A, and the first structural color 450 is presented at the seventh forefoot portion 378B. In FIG. 7, the first structural-color element 230 has partially abraded such that the sixth color 422 of the fourth substrate 140 is presented.

In example aspects and as is depicted by the differing representations of the fifth color 412 of the third substrate 130 and the sixth color 422 of the fourth substrate 140 in FIGS. 5A-7, it is contemplated that the fifth color 412 and the sixth color 422 are visually different from another. Moreover, as is also depicted by the representations of each of the first structural color 450, the second structural color 460, and third structural color 470, it is contemplated that the first structural color 450 and the second structural color 460 are visually similar to one another and are both visually different to the third structural color 470. Considering these aspects collectively, it is also contemplated that first and second structural colors 450, 460 may obscure the fifth and sixth colors 412, 422, which are visually different form one another and the first and second structural colors 450, 460, to present a uniform or normalized color appearance. Continuing, upon removal of the first and second structural-color elements 230, 240 (e.g., abrading or wearing away during normal wear, active removal by a wearer including scratching, scraping, cutting, sanding, burning, peeling, or dissolving the concealing layer, etc.), the obscuring by the first and second structural colors 450, 460 is reduced and the fifth and sixth colors 412, 422 are presented, thereby diminishing the uniform or normalized color appearance presented by the first and second structural colors 450, 460. As discussed herein, whether the fifth and sixth colors 412, 422 and the first, second, and third structural colors 450, 460, 470 are visually different or similar may be determined using methods and calculations described herein.

Figure 8A:
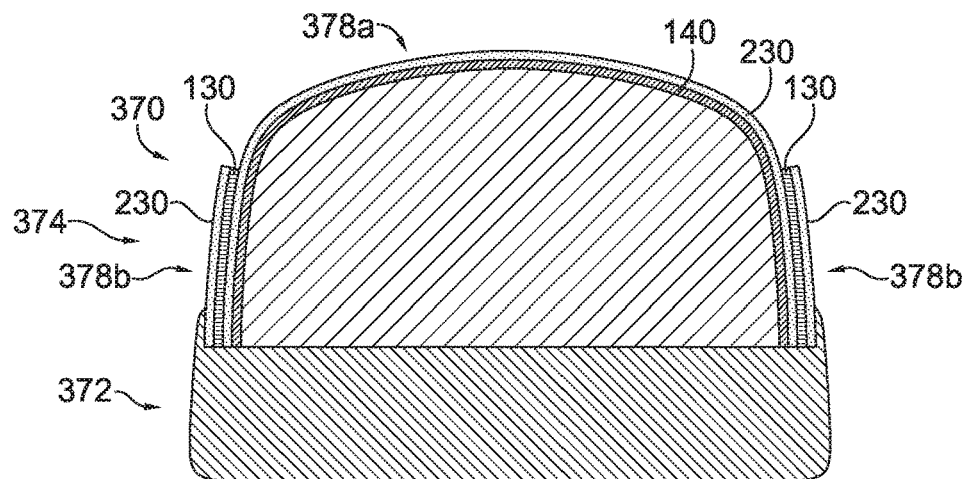
FIGS. 8A-8C illustrate sectional views of a footwear article of the second array of colored footwear articles of FIG. 6 taken along cut line 8A-C-8A-C of FIG. 6 and depicts example constructions of an upper of the footwear article.
Figure 8B:
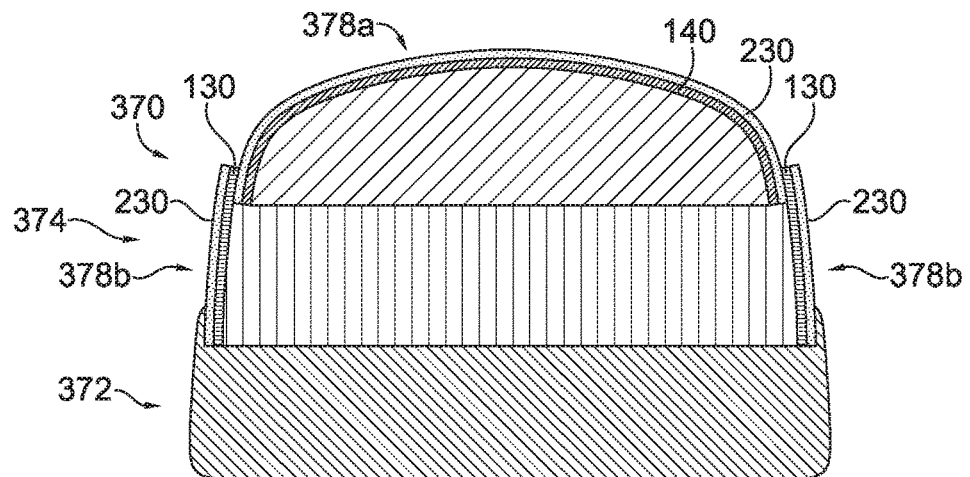
Figure 8C:
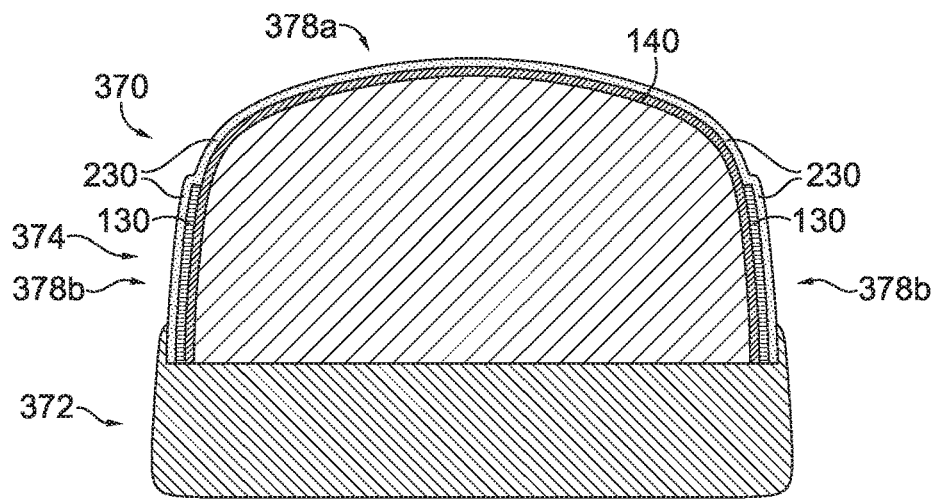

FIGS. 8A-8C illustrate sectional views of the seventh footwear article 370. In FIG. 8A, the seventh upper 374 is depicted as including a continuous layer of the fifth concealed material 151 in which the fourth substrate 140 attaches to the seventh sole structure 372 and extends upwards. In addition, the third concealed material 131 extends overtop the fifth concealed material 151 at the seventh forefoot portion 378B. As such, the first structural-color element 230 is positioned between the third and fourth substrates 130, 140 in the seventh upper 374 at the seventh forefoot portion 378B.

FIG. 8B depicts a patchwork construction of the seventh upper 374 in which the fifth concealed material 151 and the third concealed material 131 overlap along shared edges of the seventh toe portion 378A and the seventh forefoot portion 378B. Thus, in this example, the first structural-color element 230 is positioned between the third and fourth substrates 130, 140 in the seventh upper 374 at an overlapping edge of the seventh toe portion 378A and the seventh forefoot portion 378B.

FIG. 8C depicts a construction of the seventh upper 374 that is similar to 8A, but in the example of 8C, the third and fourth substrates 130, 140 are joined together to form the seventh upper 374 before the first structural-color element 230 is applied. Therefore, the first structural-color element 230 is not positioned between the third and fourth substrates 130, 140 but rather, forms a lip overtop the third and fourth substrates 130, 140 in the seventh upper 374 at an overlapping edge of the seventh toe portion 378A and the seventh forefoot portion 378B.

Figure 9:
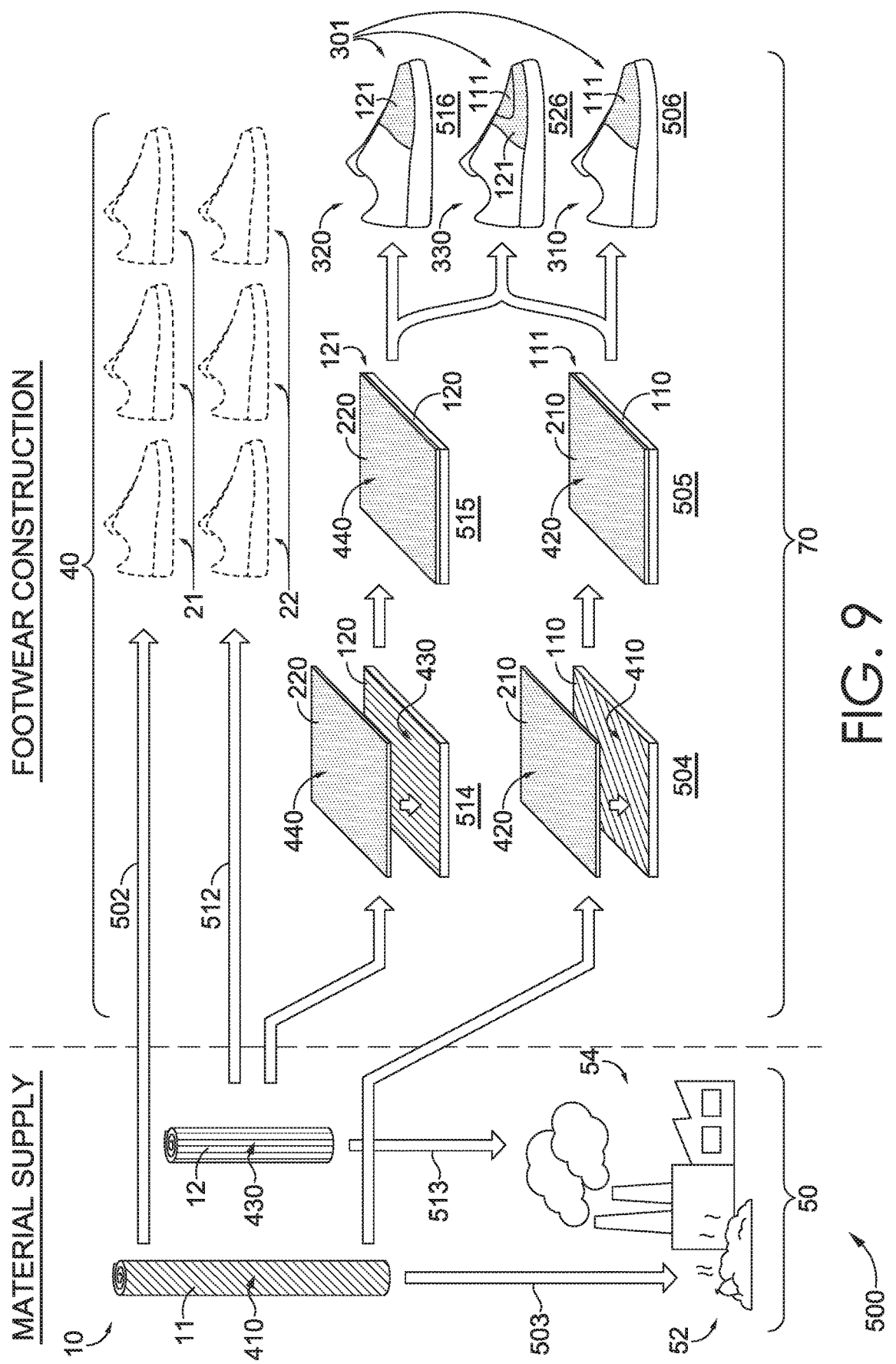
FIG. 9 illustrates an example method of footwear manufacturing in which substrates are obscured with concealing layers and are used to construct footwear articles, in accordance with an aspect hereof.

FIG. 9 illustrates an example method of footwear manufacturing 500 in which materials that were designated for disposal and for manufacturing discontinued footwear articles are repurposed and used to construct footwear articles, in accordance with an aspect hereof. To aid in explanation, the method of footwear manufacturing 500 is described with general reference to aspects of the first and second concealed materials 111, 121 and the first array of colored footwear articles 301, which are described above in connection with FIGS. 2A-4. However, as explained, aspects herein contemplate that the third, fourth, and fifth concealed materials 131, 141, 151 may be implemented in the method of footwear manufacturing 500 to construct the second array of colored footwear articles 301, which are described above in connection with FIGS. 5A-8C. FIG. 9, like FIG. 1, includes brackets and arrows to depict various aspects of stages of the method of manufacturing footwear 500, which provide contextual information for steps of the method of manufacturing footwear 500 and therefore, are first discussed. Some of these stages and their aspects are similar to those of the method of manufacturing footwear 1 shown in FIG. 1 and therefore, like reference characters are used to describe similar aspects in FIG. 9.

As such, an arrow 502 illustrates that a first material roll 11 of the material rolls 10 was previously designated to be used to manufacture a first array of discontinued footwear articles 21 (e.g., prior season, prior colorway, anticipated but unfilled, etc.), and an arrow 503 illustrates that the first material roll 11 was previously designated to be disposed of by incineration 52. Similarly, an arrow 512 illustrates that a second material roll 12 of the material rolls 10 was also previously designated to be used to manufacture a second array of discontinued footwear articles 22 (e.g., prior season, prior colorway, anticipated but unfilled, etc.), and an arrow 513 illustrates that the second material roll 13 was previously designated to be disposed of in a landfill 54.

Brackets 40, 50, 70, like in FIG. 1, each identify an entity involved in footwear-article manufacturing, which includes material suppliers and footwear manufacturers. Specifically, the brackets identify a material supply entity 50, a first footwear construction entity 40, and a second footwear construction entity 70. Generally, the material supply entity 50 sources, produces, and/or provides materials, and the first and second footwear construction entities 40, 70 designate and use those materials to construct footwear articles. In the example of FIG. 9, the first footwear construction entity 40 designated but did not use the first material roll 11 to construct the first array of discontinued footwear articles 21, and the first footwear construction entity 40, the material supply entity 50, or both designated the first material roll 11 for disposal. Staying with this example, the first footwear construction entity 40 also designated but did not use the second material roll 12 to construct the second array of discontinued footwear articles 22, and the first footwear construction entity 40, the material supply entity 50, or both designated the second material roll 12 for disposal. Prior to disposal, the second footwear construction entity 70 intervenes and acquires the first and second material rolls 11, 12 for the method of manufacturing footwear 500, at which point, the first and second material rolls 11, 12 are considered to be repurposed. In some instances, the second footwear construction entity 70 may be different than the first footwear construction entity 40. In other instances, the first and second footwear construction entities 40, 70 may be the same entity.

As shown in FIG. 9, manufacturing footwear articles 310, 320, 330 includes a step 504 of obtaining a first substrate 110 from the first material roll 11 that was designated to be disposed of and was previously designated to be used to manufacture the first array of discontinued footwear articles 21. The step 504 may also include designating the first substrate 110 to be used to manufacture a first array of colored footwear articles 301 which may occur before, after, or in conjunction with obtaining the first substrate 110. At a step 514, a second substrate 120 is obtained from the second material roll 12 that was designated to be used to manufacture the second array of discontinued footwear articles 22. Next, at a step 505, a first concealing layer 210 is applied to a surface of the first substrate 110 and in combination, the first substrate 110 and the first concealing layer 210 form a first concealed material 111. At a step 515, a second concealing layer 220 is applied to a surface of the second substrate 120 and in combination, the second substrate 120 and the second concealing layer 220 form a second concealed material 121.

The first concealed material 111 and the second concealed material 121 are then used to construct footwear articles, such as the first array of colored footwear articles 301 and this may be executed using various techniques or approaches. For example, at a step 506, the first concealed material 111 is used to construct some or all of an upper of a first footwear article 310. Alternatively or additionally, at a step 516, the second concealed material 121 is used to construct some or all of an upper of a second footwear article 320. Alternatively or additionally, at a step 526, the first concealed material 111 and the second concealed material 121 are used in combination to construct some or all of an upper of a third footwear article 330.

Although not depicted in FIG. 9, aspects herein contemplate that any of the steps 504, 514, 505, 515, 506, 516, 526 of the method of footwear manufacturing 500 may be repeated or duplicated such that one or more additional substrates are obtained from the first and second material rolls 11, 12, combined with the first and second concealing layers 210, 220 and used to construct additional articles in the array of colored footwear articles 301. Moreover, aspects herein contemplate that the first and second material rolls 11, 12, as well as the first and second substrates 110, 120 may be a non-generic or differentiated material (e.g., having one or more unique or differentiating characteristics, such as color, surface texture, composition, construction, etc.) or a combination of two or more non-generic or differentiated materials having one or more characteristics. Likewise, the first and second concealing layers 210, 220 may also be a specified material or combination of two or more specified materials and may also have one or more characteristics (e.g., a tear-able fabric having a second color). It is further contemplated that these aspects of the first and second material rolls 11, 12, the first and second substrates 110, 120, and the first and second concealing layers 210, 220 may be combined in multiple ways to provide different versions of the first and second concealed materials 111, 121.

In addition, aspects herein contemplate that the method of footwear manufacturing 500 may implement concealing layers that include a structural color element (e.g., the first and second structural-color elements 230, 240) and/or other substrates (e.g., the third and fourth substrates 130, 140) to form other concealed materials (the third, fourth, and fifth concealed materials 131, 141, 151) to manufacture any one of the fourth, fifth, sixth, seventh footwear articles 340, 350, 360, 370 of the second array of colored footwear articles 302. For example, at the step 504, the third substrate 130 may be obtained from the first material roll 11 and may also be designated to be used to manufacture the second array of colored footwear articles 302. Continuing, at the step 514, the fourth substrate 140 may be obtained from the second material roll 12. Next, at the step 505, the first structural-color element 230 may be applied to a surface of the third substrate 130 and in combination, the third substrate 130 and the first structural-color element 230 form the third concealed material 131. At the step 515, the second structural-color element 240 may be applied to a surface of the fourth substrate 140 and in combination, the fourth substrate 140 and the second structural-color element 240 form the fourth concealed material 141.

The third concealed material 131 and the fourth concealed material 141 are then used to construct any one of the fourth, fifth, or sixth footwear articles 340, 350, 360 of the second array of colored footwear articles 302 and this may be executed using various techniques or approaches. For example, at a step 506, the third concealed material 131 may be used to construct some or all of an upper of the fourth footwear article 340. Alternatively or additionally, at the step 516, the fourth concealed material 141 may be used to construct some or all of an upper of the fifth footwear article 350. Alternatively or additionally, at the step 526, the third concealed material 131 and the fourth concealed material 141 may be used in combination to construct some or all of an upper of the sixth footwear article 360. In other aspects, the same steps may be taken to form the fifth concealed material 151 by applying the first structural-color element 230 to a surface of the fourth substrate 140. These aspects further contemplate that the fifth concealed material 151 may then be used individually or in combination with the third and fourth concealed materials 131, 141 to construct footwear articles. For example, the third concealed material 131 and the fifth concealed material 151 may be used in combination to construct some or all of an upper of the seventh footwear article 370.

As used in this disclosure, an array of footwear articles may include various combinations of pairs of footwear articles having shoe sizes and patterns of footwear-upper parts. As used in this disclosure, a shoe size includes a shoe-size length determined according to the US shoe-sizing system. As such, two pairs of shoes include a same shoe size when both pairs include the same US shoe size (e.g., same whole-number shoe size or same half-number shoe size) or an equivalent of a US shoe size determined under some alternative shoe-sizing system (e.g., Continental European system). Two pairs of shoes include a different shoe size when each pair includes a different US shoe size or an equivalent thereof. The pattern of footwear-upper parts describes the arrangement of one or more discrete material panels forming the footwear upper. Two shoes include a same pattern of footwear-upper parts when corresponding positions on each shoe (e.g., all corresponding positions on each shoe) include respective panels that have geometrically similar shapes (e.g., same shape) or mirror images thereof. In contrast, two shoes include a different pattern of footwear-upper parts when corresponding positions on each shoe (e.g., at least one corresponding position) include respective panels that have geometrically different shapes or when one shoe includes a corresponding position omitted entirely from the other shoe.

In one aspect of the present disclosure, an array of footwear articles may include two or more pairs of footwear articles having a same shoe size and a same pattern of footwear-upper parts. In another aspect of the present disclosure, an array of footwear articles may include two or more pairs of footwear articles having a same shoe size and different respective patterns of footwear-upper parts. In a further aspect of the present disclosure, an array of footwear articles may include two or more pairs of footwear articles having different shoe sizes and a same pattern of footwear-upper parts. In yet another aspect of the present disclosure, an array of footwear articles may include two or more pairs of footwear articles having different shoe sizes and different respective patterns of footwear-upper parts.

In aspects related to repurposing materials, it is contemplated that a substrate may be a repurposed material, which is a material that was designated for disposal (e.g., a previously to-be disposed of material) and that, prior to being disposed, is obtained and/or designated for manufacturing a footwear article. Some aspects contemplate that the material may be designated to be disposed of in a variety of manners, such as incinerated, in a landfill, compacted, and the like. Additional aspects contemplate that the previously to-be disposed of material may have been designated for disposal by one or more entities involved in footwear manufacturing (e.g., a material supplier) and further contemplate that the previously to-be disposed of material is obtained and/or designated for manufacturing a footwear article by one or more entities involved in footwear manufacturing (e.g., a footwear manufacturer).

Aspects related to repurposing materials contemplate that a material may be designated for disposal in various manners. For example, designation may include an explicit assignment or earmark to be disposed of. Alternatively, a material may be inherently designated for disposal, such as where the material has been stored longer than a threshold duration without being used or transferred to another entity in the footwear-manufacturing process, and the threshold duration may be 30 days, or alternatively 60 days, or alternatively 90 days, or alternatively 180 days.

Other aspects related to repurposing materials contemplate that a repurposed material is a material that was previously designated to be used to manufacture a discontinued footwear article and is designated to be used to manufacture a different footwear article (e.g., a re-designated material). Such aspects contemplate that the re-designated material may have been previously designated to be used to manufacture the discontinued footwear article and/or is designated to manufacture the different footwear article by one or more entities involved in footwear manufacturing (e.g., a first and/or second footwear manufacturer source) and may include one or more of the same or different entities. In some aspects, a manufacturing of the discontinued footwear article is canceled and the repurposed material is stored.

Further aspects related to repurposing materials contemplate that a repurposed material is a previously to-be disposed of material and is also a re-designated material. In these aspects, it is contemplated that the repurposed material may include any combination of aspects related to the previously to-be disposed of material and aspects related to the re-designated material. For example, the repurposed material may be a material that was designated to be disposed of by a material supplier, was previously designated to be used to manufacture a first footwear article by a first footwear manufacturer, and prior to disposal, is obtained by a second footwear manufacturer and designated for manufacturing a second footwear article.

In aspects related to repurposing materials that involve a concealing layer, it is contemplated that a repurposed material is a previously to-be disposed of material with a concealing layer, a re-designated material with a masking, or any combination thereof with a concealing layer. Some aspects contemplate that any material that is repurposed in this manner may include any combination of the aspects related to a previously to-be disposed of material and/or the aspects related to a re-designated material. Other aspects herein contemplate that any material that is repurposed in a manner that involves a concealing layer has also been repurposed in by a minimum of at least being designated for disposal or being designated to manufacture a footwear article after previously being designated to manufacture a discontinued footwear article.

Continuing with these aspects, it is contemplated that the concealing layer may be configured to modify or alter one or more characteristics of a substrate that is a repurposed material. In such instances, the repurposed material may include one or more characteristics, like that of the substrate, which, in addition to color, include a composition, a basis weight, a thickness, a construction, and a surface topography. In aspects, the concealing layer is applied to a surface of a repurposed material such that a color presented by the repurposed material at the surface is obscured by the concealing layer. The concealing layer may be applied to two repurposed materials that each present a different color at their respective surface such that the colors of each repurposed material are obscured from view by the concealing layer. In accordance with aspects herein, the concealing layer is a structurally colored element and produces a color when applied to a repurposed material.

In additional aspects related to types of substrates or materials thereof that may be repurposed, it is contemplate that any substrate or material that may be used to construct and/or included in footwear articles may be repurposed, such as textiles, polymer foams, molded polymeric components, natural leathers, synthetic leathers, and the like. In aspects, a repurposed material may be a textile, and such aspects contemplate that the textile can be a nonwoven textile, a synthetic leather, a knit textile, or a woven textile. The textile may comprise a first fiber or a first yarn, where the first fiber or the first yarn can include at least an outer layer formed of the first thermoplastic material.

In aspects, a textile constituting a repurposed material may include any material manufactured from fibers, filaments, or yarns characterized by flexibility, fineness, and a high ratio of length to thickness. Textiles may generally fall into two categories. The first category includes textiles produced directly from webs of filaments or fibers by randomly interlocking to construct non-woven fabrics and felts. The second category includes textiles formed through a mechanical manipulation of yarn, thereby producing a woven fabric, a knitted fabric, a braided fabric, a crocheted fabric, and the like.

The terms "filament," "fiber," or "fibers" as used herein refer to materials that are in the form of discrete elongated pieces that are significantly longer than they are wide. The fiber can include natural, manmade or synthetic fibers. The fibers may be produced by conventional techniques, such as extrusion, electrospinning, interfacial polymerization, pulling, and the like. The fibers can include carbon fibers, boron fibers, silicon carbide fibers, titania fibers, alumina fibers, quartz fibers, glass fibers, such as E, A, C, ECR, R, S, D, and NE glasses and quartz, or the like. The fibers can be fibers formed from synthetic polymers capable of forming fibers such as poly(ether ketone), polyimide, polybenzoxazole, poly(phenylene sulfide), polyesters, polyolefins (e.g., polyethylene, polypropylene), aromatic polyamides (e.g., an aramid polymer such as para-aramid fibers and meta-aramid fibers), aromatic polyimides, polybenzimidazoles, polyetherimides, polytetrafluoroethylene, acrylic, modacrylic, poly(vinyl alcohol), polyamides, polyurethanes, and copolymers such as polyether-polyurea copolymers, polyester-polyurethanes, polyether block amide copolymers, or the like. The fibers can be natural fibers (e.g., silk, wool, cashmere, vicuna, cotton, flax, hemp, jute, sisal). The fibers can be man-made fibers from regenerated natural polymers, such as rayon, lyocell, acetate, triacetate, rubber, and poly (lactic acid).

As used herein, the term "yarn" refers to an assembly formed of one or more fibers, wherein the strand has a substantial length and a relatively small cross-section, and is suitable for use in the production of textiles by hand or by machine, including textiles made using weaving, knitting, crocheting, braiding, sewing, embroidery, or ropemaking techniques. Thread is a type of yarn commonly used for sewing.

Yarns can be made using fibers formed of natural, manmade and synthetic materials. Synthetic fibers are most commonly used to make spun yarns from staple fibers, and filament yarns. Spun yarn is made by arranging and twisting staple fibers together to make a cohesive strand. The process of forming a yarn from staple fibers typically includes carding and drawing the fibers to form sliver, drawing out and twisting the sliver to form roving, and spinning the roving to form a strand. Multiple strands can be plied (twisted together) to make a thicker yarn. The twist direction of the staple fibers and of the plies can affect the final properties of the yarn. A filament yarn can be formed of a single long, substantially continuous filament, which is conventionally referred to as a "monofilament yarn," or a plurality of individual filaments grouped together. A filament yarn can also be formed of two or more long, substantially continuous filaments which are grouped together by grouping the filaments together by twisting them or entangling them or both. As with staple yarns, multiple strands can be plied together to form a thicker yarn.

Once formed, the yarn can undergo further treatment such as texturizing, thermal or mechanical treating, or coating with a material such as a synthetic polymer. The fibers, yarns, or textiles, or any combination thereof, used in the disclosed articles can be sized. Sized fibers, yarns, and/or textiles are coated on at least part of their surface with a sizing composition selected to change the absorption or wear characteristics, or for compatibility with other materials. The sizing composition facilitates wet-out and wet-through of the coating or resin upon the surface and assists in attaining desired physical properties in the final article. An exemplary sizing composition can comprise, for example, epoxy polymers, urethane-modified epoxy polymers, polyester polymers, phenol polymers, polyamide polymers, polyurethane polymers, polycarbonate polymers, polyetherimide polymers, polyamideimide polymers, polystylylpyridine polymers, polyimide polymers bismaleimide polymers, polysulfone polymers, polyethersulfone polymers, epoxy-modified urethane polymers, polyvinyl alcohol polymers, polyvinyl pyrrolidone polymers, and mixtures thereof.

Two or more yarns can be combined, for example, to form composite yarns such as single- or double-covered yarns, and corespun yarns. Accordingly, yarns may have a variety of configurations that generally conform to the descriptions provided herein. The yarn can comprise at least one thermoplastic material (e.g., one or more of the fibers can be made of thermoplastic material). The yarn can be made of a thermoplastic material. The yarn can be coated with a layer of a material such as a thermoplastic material.

Various techniques exist for mechanically manipulating yarns to form a textile. Such techniques include, for example, interweaving, intertwining and twisting, and interlooping. Interweaving is the intersection of two yarns that cross and interweave at right angles to each other. The yarns utilized in interweaving are conventionally referred to as "warp" and "weft." A woven textile includes include a warp yarn and a weft yarn. The warp yarn extends in a first direction, and the weft strand extends in a second direction that is substantially perpendicular to the first direction. Intertwining and twisting encompasses various procedures, such as braiding and knotting, where yarns intertwine with each other to form a textile. Interlooping involves the formation of a plurality of columns of intermeshed loops, with knitting being the most common method of interlooping. The textile may be primarily formed from one or more yarns that are mechanically-manipulated, for example, through interweaving, intertwining and twisting, and/or interlooping processes, as mentioned above.

Aspects related to a textile being a nonwoven textile contemplate that a nonwoven textile or fabric is a sheet or web structure made from fibers and/or yarns that are bonded together. The bond can be a chemical and/or mechanical bond, and can be formed using heat, solvent, adhesive or a combination thereof. Exemplary nonwoven fabrics are flat or tufted porous sheets that are made directly from separate fibers, molten plastic and/or plastic film. They are not made by weaving or knitting and do not necessarily require converting the fibers to yarn, although yarns can be used as a source of the fibers. Nonwoven textiles are typically manufactured by putting small fibers together in the form of a sheet or web (similar to paper on a paper machine), and then binding them either mechanically (as in the case of felt, by interlocking them with serrated or barbed needles, or hydro-entanglement such that the inter-fiber friction results in a stronger fabric), with an adhesive, or thermally (by applying binder (in the form of powder, paste, or polymer melt) and melting the binder onto the web by increasing temperature). A nonwoven textile can be made from staple fibers (e.g., from wetlaid, airlaid, carding/crosslapping processes), or extruded fibers (e.g., from meltblown or spunbond processes, or a combination thereof), or a combination thereof. Bonding of the fibers in the nonwoven textile can be achieved with thermal bonding (with or without calendering), hydro-entanglement, ultrasonic bonding, needlepunching (needlefelting), chemical bonding (e.g., using binders such as latex emulsions or solution polymers or binder fibers or powders), meltblown bonding (e.g., fiber is bonded as air attenuated fibers intertangle during simultaneous fiber and web formation).

"A," "an," "the," "at least one," and "one or more" might be used interchangeably to indicate that at least one of the items is present. When such terminology is used, a plurality of such items might be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated materials, features, steps, operations, elements, or components, but do not preclude the presence or addition of one or more other materials, features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

The phrases "formed from" and "formed of" are also intended throughout this disclosure and the accompanying claims to be inclusive, and to specify the presence of stated materials, features, steps, operations, elements, or components, but to not preclude the presence or addition of one or more other materials, features, steps, operations, elements, or components unless otherwise indicated.

For consistency and convenience, directional adjectives might be employed throughout this detailed description corresponding to the illustrated examples. Ordinary skilled artisans will recognize that terms such as "above," "below," "upward," "downward," "top," "bottom," etc., may be used descriptively relative to the figures, without representing limitations on the scope of the inventive embodiments described in this Specification, and as further defined by the claims.

The term "longitudinal," as possibly used throughout this detailed description and in the claims, refers to a direction extending along a length of a component; that is, aligned with its longest dimension, unless otherwise indicated. For example, a longitudinal direction of a shoe extends from a forefoot region toward a heel region of the shoe, or vise-versa. In some instances, a 'longitudinal' axis of a component may be designated with reference to and aligned with a longitudinal axis of another component or of a structure of which the component is a part, and will be so described for clarity. The terms "forward" or "anterior" are used to refer to the general direction from a heel region toward a forefoot region, and the terms "rearward" or "posterior" are used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse," as possibly used throughout this detailed description and in the claims, refers to a direction extending across a width of a component. For example, a transverse direction of a shoe extends from a lateral side toward a medial side of the shoe, or vise-versa. The transverse direction or axis may also be referred to as a lateral direction or axis or a mediolateral direction or axis.

The term "vertical," as possibly used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region, and/or a throat of an upper. The term "downward" or "downwards" refers to the vertical direction pointing opposite the upwards direction, toward the bottom of a component, and may generally point towards the bottom of a sole structure of an article of footwear.

The "interior" of an article of footwear, such as a shoe, refers to portions at the space that is occupied by a wearer's foot when the shoe is worn. The "inner side" of a component refers to the side or surface of the component that is (or will be) oriented toward the interior of an assembled article of footwear. The "outer side" or "exterior" of a component refers to the side or surface of the component that is (or will be) oriented away from the interior of an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" shall refer to the direction toward the interior of the component or article of footwear, such as a shoe, and the terms "outward" and "outwardly" shall refer to the direction toward the exterior of the component or article of footwear, such as a shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

In describing a footwear article, the relative terms "inferior" and "superior" may also be used. For example, the superior portion generally corresponds with a top portion that is oriented closer towards a person's head when the person's feet are positioned flat on a horizontal ground surface and the person is standing upright, whereas the inferior portion generally corresponds with a bottom portion oriented farther from a person's head and closer to the ground surface.

In other instances, standard anatomical terms of orientation may be used to describe a footwear article. For example, the footwear article may be described in terms of including a coronal plane, a sagittal plane, and an axial (transverse) plane. The coronal plane extends vertically and in a longitudinal orientation, such that the coronal plane may divide the footwear article into a relative medial side and a relative lateral side. The sagittal plane also extends vertically, but in contrast to the coronal plane, extends in the transverse orientation, and may divide the footwear article into a relatively anterior or front portion and a relatively posterior or back portion. The axial (transverse) plane extends general horizontally, and may divide the footwear article into a relatively superior or top portion and a relatively inferior or bottom portion. It is further understood that the referential axes and planes described in this disclosure, when used in relation to the shoe, remain fixed relative to the shoe, and rotate in space with the shoe as the shoe rotates. For example, the vertical axis of the shoe remains the vertical axis of the shoe irrespective to any change in the orientation of the shoe in space at any given time.

As will be discussed throughout, it is contemplated that aspects provided herein are directed to methods for manufacturing footwear and are also directed to footwear articles, which may or may not be manufactured by the provided methods. Many aspects relate to both the methods for manufacturing footwear and the footwear articles themselves, and therefore, some aspects may be described in differing manners depending on context. For instance, a concealed material may be referred to as a concealed portion of a footwear article that includes a substrate and a concealing layer. Accordingly, contextual descriptions of any aspects provided herein are not limiting to the scope of applicability for any claimed aspects.

As evidenced throughout, aspects herein may be implemented in a variety of ways to repurpose materials to afford different features to footwear articles constructed with repurposed materials. Many of these aspects involve a variety of techniques, characteristics, and/or properties that may affect their interaction in differing manners. Such interactions may produce different structural colors, and therefore, these aspects may selectively be employed to adjust one or more characteristics of footwear articles.

Aspects herein provide an array of colored footwear articles including a first footwear article that has a first concealed portion comprising a first repurposed material and a first concealing layer and also including a second footwear article that has a second concealed portion comprising a second repurposed material and a second concealing layer. These aspects also provide that the first repurposed material has a first color that is obscured by the first concealing layer, which has a second color and further provide that the second repurposed material has a third color that is obscured by the second concealing layer, which also has a fourth color. Similar aspects herein provide a method of manufacturing footwear including a step of applying a concealing layer on a surface of a substrate, which may be a repurposed material, presenting a color in which the concealing layer obscures the surface and the substrate combined with the concealing layer applied thereto comprise a concealed material.

Other aspects herein provide a footwear article with an upper including a first and second substrate, one of which is a repurposed material, a first structural-color element applied to the first substrate and producing a first structural color, and a second structural color element applied to the second substrate and producing a second structural color that is visually similar to the first structural color. In some aspects, the first and second structural-color elements include a same set of layers and/or a same set of properties, and in such aspects, the first and second structural colors produced by the respective first and second structural color layers may be visually different or visually similar depending on the color and/or the one or more characteristics of the underlying first and second substrates. Related aspects contemplate, the first and second structural-color elements may be configured such that the first and second structural colors that are respectively produced are visually similar, even when the color and/or the one or more characteristics of the underlying first and second substrate are different. Related aspects contemplate an array of colored footwear articles including a first and second footwear article in which each footwear article comprises a portion including a substrate and a structural-color element that obscures a color of the substrate from view and presents another color. Such aspects further contemplate that the substrate of at least one of the footwear articles includes a repurposed material. Similar aspects contemplate a method of manufacturing footwear including a step of applying a structural-element on a surface of a substrate presenting a color in which the structural-color element obscures the surface and the substrate and produces a structural color. Moreover, these aspects contemplate that the substrate combined with the structural-color element applied thereto comprise a concealed material.

Some aspects of this disclosure have been described with respect to the examples provided in the figures. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations. Further, the terminology "any of clauses" or similar variations of said terminology is intended to include "any one of clauses" or other variations of such terminology, as indicated by some of the examples provided above.

The following clauses are aspects contemplated herein.

Clause 1. An array of colored footwear articles, the array comprising: a first footwear article comprising a first concealed portion, the first concealed portion comprising a first repurposed material previously designated to be disposed of and a first concealing layer, the first repurposed material having a first color obscured from view by the first concealing layer, which includes a second color; and a second footwear article comprising a second concealed portion, the second concealed portion comprising a second repurposed material previously designated to be disposed of and a second concealing layer, the second repurposed material having a third color obscured from view by the second concealing layer, which includes a fourth color.

Clause 2. The array of Clause 1, wherein the first footwear article and the second footwear article each includes a respective upper having a pattern of panels, and wherein the pattern of panels for the first footwear article is the same as the pattern of panels for the second footwear article.

Clause 3. The array of any of Clauses 1-2, wherein the first footwear article is a first shoe size and the second footwear article is a second shoe size, which is different from the first shoe size.

Clause 4. The array of any of Clauses 1-2, wherein the first concealed portion and the second concealed portion are on corresponding locations of respective footwear articles, and wherein the first color and the third color are visually different from one another.

Clause 5. The array of any of Clauses 1-4, wherein the first repurposed material and the second repurposed material were each previously designated to be incorporated into a respective different footwear article.

Clause 6. The array of Clause 5, wherein the respective different footwear article includes a discontinued colorway.

Clause 7. The array of Clause 5, wherein the respective different footwear article includes a differently arranged pattern of footwear-upper panels.

Clause 8. The array of any of Clauses 1-7, wherein the first repurposed material comprises a first characteristic chosen from at least one of a first composition, a first basis weight, a first thickness, a first construction, and a first surface topography; wherein the second repurposed material comprises a second characteristic chosen from at least one of a second composition, a second basis weight, a second thickness, a second construction, and a second surface topography; and wherein the first characteristic of the first repurposed material is different than a corresponding second characteristic of the second repurposed material.

Clause 9. The array of Clause 8, wherein the first construction of the first repurposed material comprises synthetic leather, a knit construction, a woven construction, a non-woven construction, a braided construction, or any combination thereof.

Clause 10. The array of Clause 9, wherein the second construction of the second repurposed material comprises synthetic leather, a knit construction, a woven construction, a non-woven construction, a braided construction, or any combination thereof; and wherein the second construction is different than the first construction.

Clause 11. The array of any of Clauses 1-10, wherein the first repurposed material comprises a first synthetic leather, and wherein the second repurposed material comprises a second synthetic leather having different properties than the first synthetic leather.

Clause 12. The array of any of Clauses 1-11, wherein the first concealing layer and the second concealing layer abrade, after which the first color and the third color are presented.

Clause 13. The array of any of Clauses 1-12, wherein at least one of the first concealing layer and the second concealing layer comprises a woven textile.

Clause 14. A method of manufacturing footwear, the method comprising: obtaining a substrate that includes a first color and that was designated to be disposed of, wherein the substrate was previously designated to be used to manufacture a first footwear article; designating the substrate to be used to manufacture a second footwear article; applying a concealing layer on a surface of the substrate presenting the first color, the concealing layer obscuring the surface, wherein the substrate combined with the concealing layer applied thereto comprises a concealed material; and constructing the second footwear article with the concealed material.

Clause 15. The method of Clause 14, wherein the method is performed by a first entity in a footwear supply chain, wherein the substrate is obtained by the first entity from a second entity in the footwear supply chain, and wherein the second entity is different from the first entity and previously designated the substrate to be disposed of.

Clause 16. The method of Clause 15, wherein the second entity previously designated the substrate to be disposed of in a landfill.

Clause 17. The method of any of Clauses 14-16, further comprising: designating the substrate to be used to manufacture the first footwear article; canceling manufacturing of the first footwear article; and storing the substrate until the applying.

Clause 18. The method of any of Clauses 14-17, wherein the substrate comprises a first substrate and the concealed material comprises a first concealed material, and wherein the method further comprises: obtaining a second substrate that includes a second color and that was designated to be disposed of, wherein the second substrate was previously designated to be used to manufacture a third footwear article; designating the second substrate to be used to manufacture a fourth footwear article in an array of footwear articles including the second footwear article; applying a concealing layer on a surface of the second substrate presenting the second color, the concealing layer obscuring the surface, wherein the second substrate with the concealing layer applied thereto comprise a second concealed material; and constructing the fourth footwear article with the second concealed material.

Clause 19. The method of Clause 18, wherein the first footwear article and the third footwear article comprise different respective upper patterns, and wherein the method further comprises designating the first substrate and the second substrate to be used to manufacture the second footwear article and the fourth footwear article comprising a same upper pattern.

Clause 20. The method of Clause 19, wherein the first concealed material and the second concealed material are positioned at corresponding locations on each respective footwear article, and wherein the first color obscured at the corresponding location of the second footwear article is visually different from the second color obscured at the corresponding location of the fourth footwear article.

Clause 21. The array of Clause 12, wherein the first and second masking layers divulge a the first color and the second color after a number of crock cycles in a range of 10 crock cycles to 50 crock cycles.

Clause 21. The array of Clause 12, wherein the first and second masking layers divulge a the first color and the second color after a number of crock cycles in a range of 50 crock cycles to 150 crock cycles.

Clause 22. The array of Clause 12, wherein the first and second masking layers divulge a the first color and the second color after a number of crock cycles in a range of 100 crock cycles to 400 crock cycles.

From the foregoing, it will be seen that the subject matter described herein is well adapted to attain all the ends and objects hereinabove set forth together with other advantages which may be obvious and which are inherent to the structure. It will be understood that certain features and subcombinations are of utility and may be employed without reference to other features and subcombinations. This is contemplated by and is within the scope of the claims. Since many possible aspects may be made of the invention without departing from the scope thereof, it is to be understood that all matter herein set forth or shown in the accompanying drawings is to be interpreted as illustrative and not in a limiting sense.

The invention claimed is:

1. A method of manufacturing footwear, the method comprising:
   obtaining a substrate that includes a first color and that was designated to be disposed of, wherein the substrate is obtained from a material roll and was previously designated to be used to manufacture a first footwear article;
   designating the substrate to be used to manufacture a second footwear article;
   applying a concealing layer on a surface of the substrate presenting the first color, the concealing layer obscuring the surface, wherein the substrate combined with the concealing layer applied thereto comprises a concealed material; and
   constructing the second footwear article with the concealed material,
   wherein, subsequent to constructing the second footwear article, the concealing layer is configured to at least partially abrade, after which a portion of the surface of the substrate is revealed.

2. The method of claim 1, wherein the method is performed by a first entity in a footwear supply chain, wherein the substrate is obtained by the first entity from a second entity in the footwear supply chain, and wherein the second entity is different from the first entity and previously designated the substrate to be disposed of.

3. The method of claim 2, wherein the second entity previously designated the substrate to be disposed of in a landfill.

4. The method of claim 1 further comprising:
   designating the substrate to be used to manufacture the first footwear article;
   canceling manufacturing of the first footwear article; and
   storing the substrate until the applying.

5. The method of claim 1, wherein the substrate comprises a first substrate, the material roll comprises a first material roll, and the concealed material comprises a first concealed material, and wherein the method further comprises:
   obtaining a second substrate that includes a second color and that was designated to be disposed of, wherein the second substrate is obtained from a second material roll and was previously designated to be used to manufacture a third footwear article;
   designating the second substrate to be used to manufacture a fourth footwear article in an array of footwear articles including the second footwear article;
   applying a concealing layer on a surface of the second substrate presenting the second color, the concealing layer obscuring the surface, wherein the second substrate with the concealing layer applied thereto comprise a second concealed material; and
   constructing the fourth footwear article with the second concealed material,
   wherein, subsequent to constructing the fourth footwear article, the concealing layer is configured to at least partially abrade, after which a portion of the surface of the second substrate is revealed.

6. The method of claim 5, wherein the first footwear article and the third footwear article comprise different respective upper patterns, and wherein the method further comprises designating the first substrate and the second substrate to be used to manufacture the second footwear article and the fourth footwear article comprising a same upper pattern.

7. The method of claim 6, wherein the first concealed material and the second concealed material are positioned at corresponding locations on each respective footwear article, and wherein the first color obscured at the corresponding location of the second footwear article is visually different from the second color obscured at the corresponding location of the fourth footwear article.

8. The method of claim 1, wherein the substrate is used to construct one or more portions of an upper of the second footwear article.

9. The method of claim 5, wherein the first substrate comprises a first characteristic chosen from at least one of a first basis weight, a first thickness, and a first surface topography; wherein the second substrate comprises a second characteristic chosen from at least one of a second basis weight, a second thickness, and a second surface topography; and wherein the first characteristic of the first substrate is different than a corresponding second characteristic of the second substrate.

10. The method of claim 9, wherein the second footwear article comprises the first characteristic of the first substrate, and wherein the fourth footwear article comprises the second characteristic of the second substrate.

\* \* \* \* \*